(12) United States Patent
Chi et al.

(10) Patent No.: US 11,067,811 B2
(45) Date of Patent: Jul. 20, 2021

(54) VOLUME BRAGG GRATINGS FOR NEAR-EYE WAVEGUIDE DISPLAY

(71) Applicant: Facebook Technologies, LLC, Menlo Park, CA (US)

(72) Inventors: Wanli Chi, Sammamish, WA (US); Hee Yoon Lee, Kirkland, WA (US); Pasi Saarikko, Kirkland, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 16/726,667

(22) Filed: Dec. 24, 2019

(65) Prior Publication Data

US 2020/0225479 A1    Jul. 16, 2020

Related U.S. Application Data

(60) Provisional application No. 62/791,563, filed on Jan. 11, 2019.

(51) Int. Cl.
*G02B 27/01* (2006.01)
*G02F 1/01* (2006.01)
(Continued)

(52) U.S. Cl.
CPC ..... *G02B 27/0172* (2013.01); *G02B 27/0081* (2013.01); *G02F 1/011* (2013.01); *G09G 3/002* (2013.01); *G02B 27/0093* (2013.01)

(58) Field of Classification Search
CPC ...... G09G 3/001; G03H 1/18; G02B 27/0172; G02B 27/0081; G02B 27/0093; G02F 1/011
(Continued)

(56) References Cited

U.S. PATENT DOCUMENTS

| 4,687,720 A | 8/1987 | Wreede et al. |
| 8,508,848 B2 | 8/2013 | Saarikko |

(Continued)

FOREIGN PATENT DOCUMENTS

| CN | 104035157 | 9/2014 |
| JP | 2007011057 | 1/2007 |

(Continued)

OTHER PUBLICATIONS

International Application No. PCT/US2020/012666, International Search Report and Written Opinion dated Apr. 2, 2020, 14 pages.

(Continued)

*Primary Examiner* — Abdul-Samad A Adediran
(74) *Attorney, Agent, or Firm* — Weaver Austin Villeneuve & Sampson LLP

(57) ABSTRACT

A waveguide display includes a substrate transparent to visible light, a coupler configured to couple display light into the substrate such that the display light propagates within the substrate through total internal reflection, a first multiplexed volume Bragg grating (VBG) on the substrate, and a second multiplexed VBG on the substrate. The second multiplexed VBG overlaps with the first multiplexed VBG in at least a see-through region of the waveguide display. The first multiplexed VBG is configured to diffract the display light to two or more regions of the second multiplexed VBG, and the second multiplexed VBG is configured to diffract the display light to two or more regions of an eyebox of the waveguide display.

23 Claims, 15 Drawing Sheets

(51) Int. Cl.
*G02B 27/00* (2006.01)
*G09G 3/00* (2006.01)

(58) Field of Classification Search
USPC .......................................................... 345/8
See application file for complete search history.

(56) References Cited

U.S. PATENT DOCUMENTS

| | | | |
|---|---|---|---|
| 8,649,099 | B2 | 2/2014 | Schultz et al. |
| 9,939,647 | B2 | 4/2018 | Vallius et al. |
| 10,859,768 | B2 | 12/2020 | Popovich et al. |
| 2003/0165017 | A1 | 9/2003 | Amitai |
| 2006/0228073 | A1 | 10/2006 | Mukawa et al. |
| 2010/0321409 | A1 | 12/2010 | Komori et al. |
| 2011/0211239 | A1 | 9/2011 | Mukawa et al. |
| 2015/0346490 | A1 | 12/2015 | Tekolste et al. |
| 2016/0077338 | A1* | 3/2016 | Robbins ................ G09G 3/002 345/8 |
| 2017/0235142 | A1 | 8/2017 | Wall et al. |
| 2017/0363871 | A1 | 12/2017 | Vallius et al. |
| 2018/0188542 | A1 | 7/2018 | Waldern et al. |
| 2018/0322845 | A1 | 11/2018 | Machida |
| 2018/0373115 | A1 | 12/2018 | Brown et al. |
| 2019/0004321 | A1 | 1/2019 | Grey et al. |
| 2019/0101866 | A1* | 4/2019 | Georgiou ................ G03H 1/18 |
| 2019/0187474 | A1 | 6/2019 | Bhargava et al. |
| 2020/0348518 | A1 | 11/2020 | Georgiou et al. |
| 2021/0055551 | A1 | 2/2021 | Chi et al. |
| 2021/0055552 | A1 | 2/2021 | Chi et al. |
| 2021/0055553 | A1 | 2/2021 | Chi et al. |
| 2021/0055554 | A1 | 2/2021 | Chi et al. |
| 2021/0055555 | A1 | 2/2021 | Chi et al. |

FOREIGN PATENT DOCUMENTS

| | | |
|---|---|---|
| WO | 2018224802 A1 | 12/2018 |
| WO | 2020146451 A1 | 7/2020 |
| WO | 2021040979 A1 | 3/2021 |
| WO | 2021040980 A1 | 3/2021 |
| WO | 2021040990 A1 | 3/2021 |
| WO | 2021041314 A1 | 3/2021 |
| WO | 2021041333 A1 | 3/2021 |

OTHER PUBLICATIONS

U.S. Non-Final Office Action dated Jan. 22, 2021 in U.S. Appl. No. 16/840,116.
U.S. Restriction Requirement dated Jan. 22, 2021 in U.S. Appl. No. 16/840,118.
International Application No. PCT/US2020/045077, International Search Report and Written Opinion dated Apr. 11, 2020, 11 pages.
International Application No. PCT/US2020/045081, International Search Report and Written Opinion dated Apr. 11, 2020, 9 pages.
International Application No. PCT/US2020/045144, International Search Report and Written Opinion dated Apr. 11, 2020, 12 pages.
International Application No. PCT/US2020/047671, International Search Report and Written Opinion dated Apr. 11, 2020, 9 pages.
International Application No. PCT/US2020/047636, International Search Report and Written Opinion dated Apr. 11, 2020, 12 pages.
U.S. Final Office Action dated May 5, 2021 in U.S. Appl. No. 16/840,116.
U.S. Non-Final Office Action dated Apr. 1, 2021 in U.S. Appl. No. 16/812,084.

* cited by examiner

VOLUME BRAGG GRATINGS FOR NEAR-EYE WAVEGUIDE DISPLAY

CROSS-REFERENCE TO RELATED APPLICATION

This patent application claims benefits of and priority to U.S. Provisional Patent Application Ser. No. 62/791,563, filed Jan. 11, 2019, entitled "Volume Bragg Gratings for Increasing Field of View and Reducing Form-Factor of Waveguide Display," the disclosure of which is hereby incorporated by reference in its entirety for all purposes.

BACKGROUND

An artificial reality system, such as a head-mounted display (HMD) or heads-up display (HUD) system, generally includes a near-eye display (e.g., a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a slanted grating. Light from the surrounding environment may pass through a see-through region of the waveguide and reach the user's eyes.

SUMMARY

This disclosure relates generally to optical see-through near-eye display systems. More specifically, disclosed herein are techniques for expanding eyebox, reducing display haze, reducing physical size, and increasing field of view of optical see-through near-eye display systems that include grating couplers. Various inventive embodiments are described herein, including devices, systems, methods, and the like.

According to some embodiments, a waveguide display may include a substrate transparent to visible light, a coupler configured to couple display light into the substrate such that the display light propagates within the substrate through total internal reflection, a first multiplexed volume Bragg grating (VBG) on the substrate, and a second multiplexed VBG on the substrate. The second multiplexed VBG may overlap with the first multiplexed VBG in at least a see-through region of the waveguide display. The first multiplexed VBG may be configured to diffract the display light to two or more regions of the second multiplexed VBG, and the second multiplexed VBG may be configured to diffract the display light to two or more regions of an eyebox of the waveguide display.

In some embodiments of the waveguide display, the first multiplexed VBG may include fewer than 100 VBGs recorded by fewer than 100 exposures, such as fewer than 50 VBGs recorded by fewer than 50 exposures. In some embodiments, the first multiplexed VBG is characterized by a thickness less than 100 µm, such as less than 50 µm. The second multiplexed VBG may include fewer than 100 VBGs recorded by fewer than 100 exposures, such as fewer than 50 VBGs recorded by fewer than 50 exposures.

In some embodiments, the waveguide display may also include a third multiplexed VBG on the substrate, where the third multiplexed VBG may be configured to diffract the display light coupled into the substrate by the coupler to the first multiplexed VBG. In some embodiments, the third multiplexed VBG may include a plurality of VBGs, where each VBG of the plurality of VBGs may have a respective grating vector same as a grating vector of a respective VBG in the first multiplexed VBG. In some embodiments, the first multiplexed VBG and the third multiplexed VBG are recorded by a same number of exposures.

In some embodiments, the waveguide display may further include a third multiplexed VBG and a fourth multiplexed VBG on the substrate. The third multiplexed VBG may be configured to diffract a first portion of the display light coupled into the substrate by the coupler to the first multiplexed VBG. The fourth multiplexed VBG may be configured to diffract a second portion of the display light coupled into the substrate by the coupler to the first multiplexed VBG. In some embodiments, the first portion of the display light and the second portion of the display light may correspond to different wavelength ranges or different fields of view. In some embodiments, the first multiplexed VBG may include a first set of VBGs and a second set of VBGs. The third multiplexed VBG may include a third set of VBGs, where each VBG in the third set of VBGs may have a respective grating vector same as a grating vector of a respective VBG in the first set of VBGs. The fourth multiplexed VBG may include a fourth set of VBGs, where each VBG in the fourth set of VBGs may have a respective grating vector same as a grating vector of a respective VBG in the second set of VBGs. The first set of VBGs and the second set of VBGs may be in different regions of the first multiplexed VBG. In some embodiments, the third multiplexed VBG and the fourth multiplexed VBG may be in different regions on a surface of the substrate or are on different layers or surfaces of the substrate.

In some embodiments of the waveguide display, the first multiplexed VBG may include a first region and a second region, where the first region may be configured to diffract the display light coupled into the substrate by the coupler to the second region of the first multiplexed VBG, and the second region of the first multiplexed VBG may at least partially overlap with the second multiplexed VBG and may be configured to diffract the display light to the second multiplexed VBG.

In some embodiments of the waveguide display, the coupler may include a diffractive coupler, a refractive coupler, or a reflective coupler. In some embodiments, the first multiplexed VBG may be configured to expand the display light in a first direction, and the second multiplexed VBG may be configured to expand the display light in a second direction.

According to certain embodiments, a method of displaying images using a waveguide display may include coupling, by a coupler, display light into a substrate that is transparent to visible light; guiding, by the substrate, the display light to propagate within the substrate; diffracting, by two or more regions of a first multiplexed volume Bragg grating (VBG), the display light to two or more regions of a second multiplexed VBG; and diffracting, by two or more regions of the second multiplexed VBG, the display light from the first multiplexed VBG to two or more regions of an eyebox of the waveguide display. The second multiplexed VBG may overlap with the first multiplexed VBG in at least a see-through region of the waveguide display.

In some embodiments, the method may also include diffracting, by a third multiplexed VBG, the display light coupled into the substrate by the coupler to the first multiplexed VBG. In some embodiments, each VBG in the third multiplexed VBG may have a respective grating vector same as a grating vector of a respective VBG in the first multiplexed VBG.

In some embodiments, the method may also include diffracting, by a third multiplexed VBG, display light in a first wavelength range to the first multiplexed VBG, and diffracting, by a fourth multiplexed VBG, display light in a second wavelength range to the first multiplexed VBG, where the fourth multiplexed VBG may be closer to the second multiplexed VBG than the third multiplexed VBG. In some embodiments, diffracting the display light in the first wavelength range to the first multiplexed VBG may include diffracting the display light in the first wavelength range to a first region of the first multiplexed VBG. Diffracting the display light in the second wavelength range to the first multiplexed VBG may include diffracting the display light in the second wavelength range to a second region of the first multiplexed VBG that is offset from the first region.

In some embodiments, the first multiplexed VBG may be recorded by between 20 and 100 exposures, the second multiplexed VBG may be recorded by fewer than 100 exposures. A thickness of the first multiplexed VBG is between 20 μm and 100 μm.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
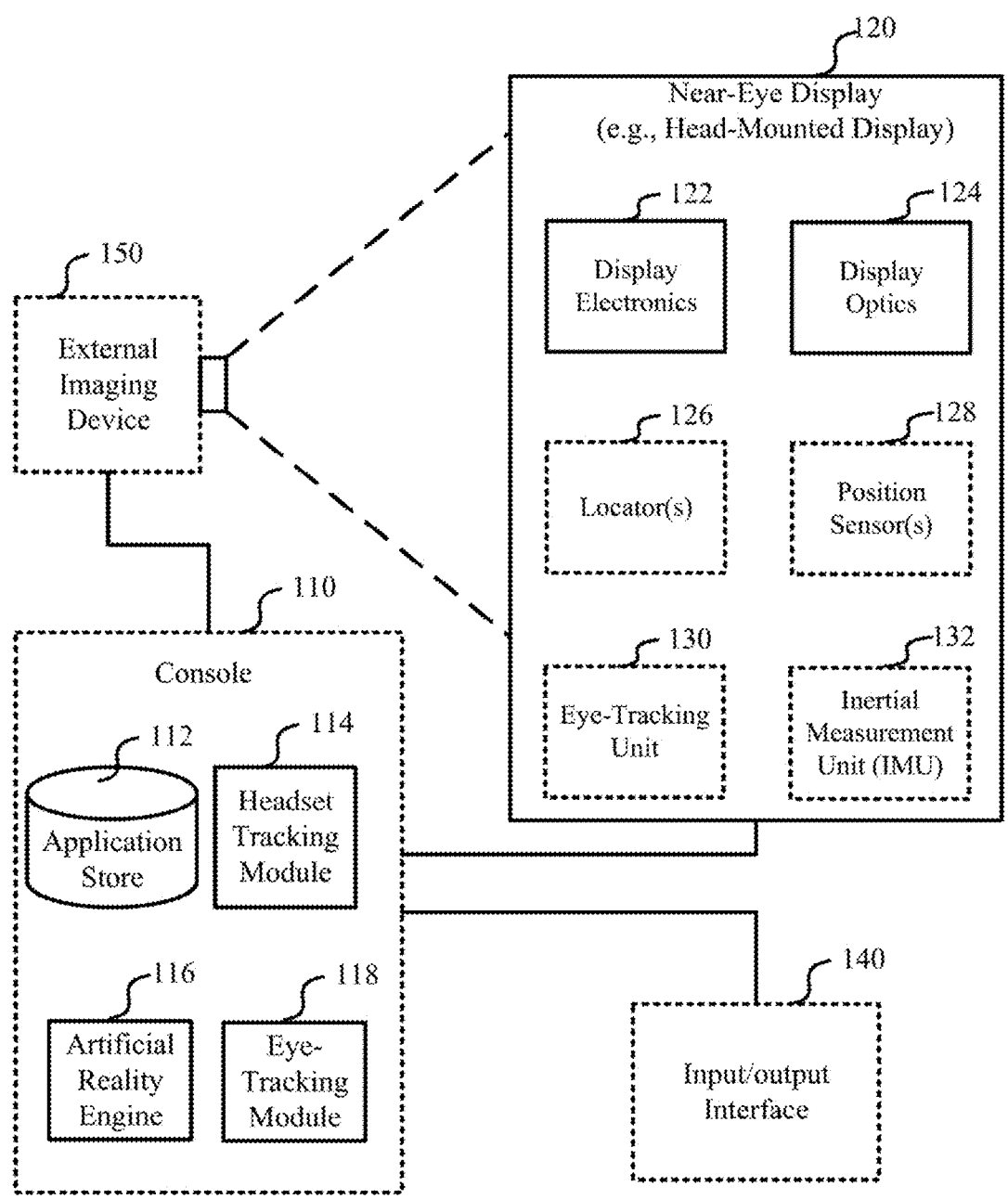
FIG. 1 is a simplified block diagram of an example artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to optical see-through near-eye display systems. More specifically, and without limitation, disclosed herein are techniques for expanding eyebox, reducing display haze, reducing physical size, and increasing the field of view of a waveguide-based near-eye display system that includes grating couplers. Various inventive embodiments are described herein, including devices, systems, methods, and the like.

According to certain embodiments, two output gratings (or two grating layers or two portions of a multiplexed grating) for dual-axis pupil expansion in a waveguide-based near-eye display may overlap in at least a portion of the optical see-through region of the waveguide-based near-eye display. The first output grating may include two or more sub-gratings or sub-regions, where a first sub-grating (or sub-region) may guide the display light in a first direction to a second sub-grating (or sub-region) for pupil replication in the first direction, and the second sub-grating (or sub-region) may guide the display light to the second output grating. The second output grating may expand the pupil in a second direction. Each of the two or more sub-gratings (or sub-regions) of the first output grating and the second output grating may be recorded in a small number (e.g., less than 100) of exposures on a thin grating material (e.g., photopolymer) layer. The second sub-grating (or sub-region) of the first output grating may overlap with the second output grating in at least a portion of the see-through region of the waveguide-based near-eye display.

Because the second sub-grating (or sub-region) of the first output grating and the second output grating are recorded in small numbers of exposures on thin grating material layers, the overlapping of the second sub-grating of the first output grating and the second output grating in the see-through region may not cause significant display haze. In addition, because of the overlapping, the overall area of the two output gratings, and thus the physical dimensions of the waveguide-based near-eye display, can be reduced. The two output gratings can expand the eyebox (or output pupil) of the waveguide-based near-eye display. Each grating or sub-grating may be a multiplexed grating to diffract display light for multiple fields of view and in different colors (wavelengths), such that the display light directed to the eyebox or output pupil can include display light for multiple fields of view and in different colors (wavelengths). As such, the eyebox and the field of view of the waveguide-based near-eye display may be increased, and the display haze and the physical dimensions of the waveguide-based near-eye display may be reduced.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140 that may each be coupled to an optional console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audios may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2-4. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (mLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to artificial reality engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light. In some embodiments, at least some of the functions of eye-tracking module 118 may be performed by eye-tracking unit 130.

Figure 2:
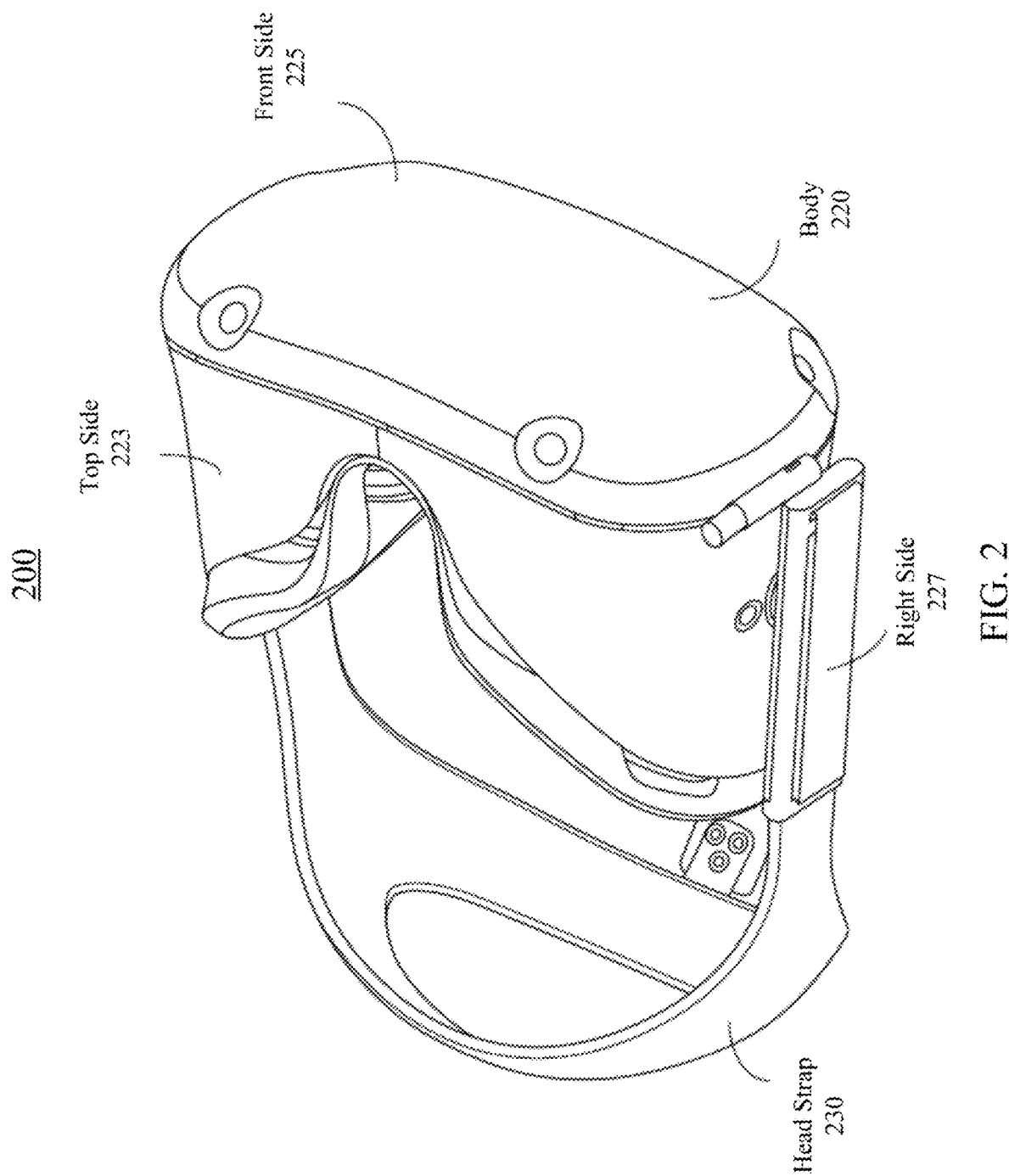
FIG. 2 is a perspective view of an example near-eye display in the form of a head-mounted display (HMD) device for implementing some of the examples disclosed herein.

FIG. 2 is a perspective view of an example of a near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
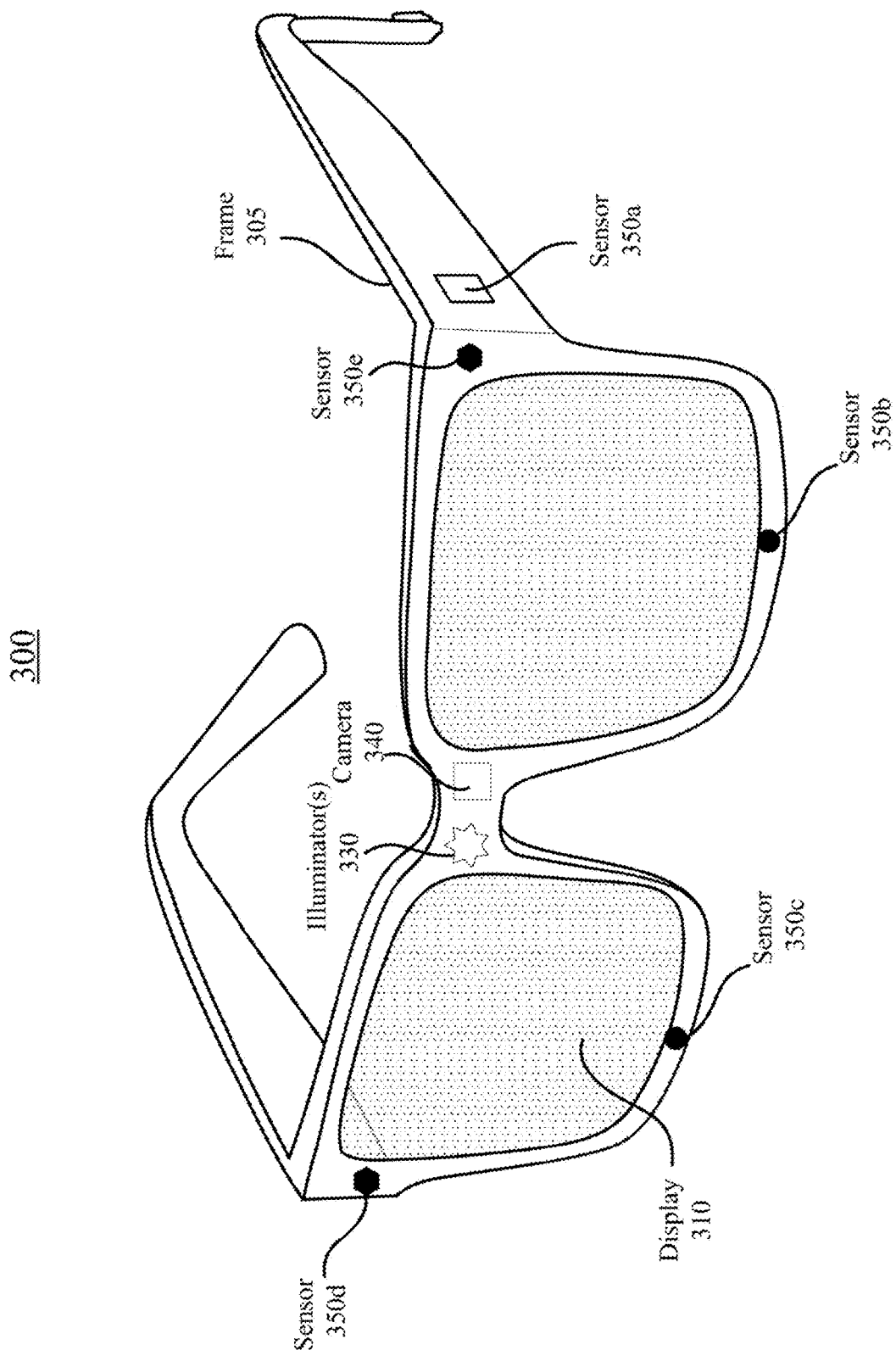
FIG. 3 is a perspective view of an example near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
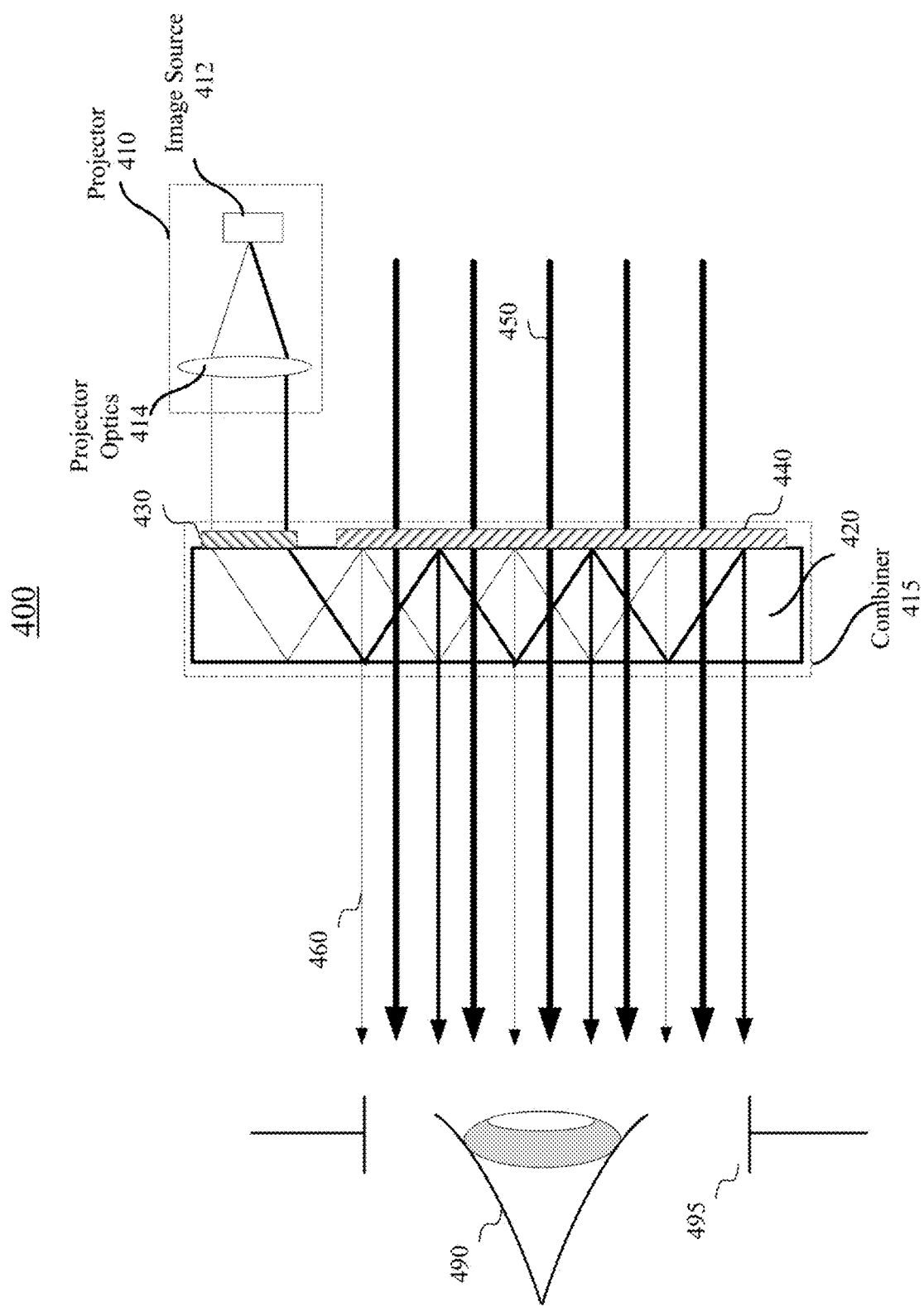
FIG. 4 illustrates an example optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical element (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of substrate 420 may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

As described above, input coupler 430 or output coupler 440 may include a Bragg grating, where the incident angle and the wavelength of the incident light may need to satisfy the Bragg phase-matching condition in order for the incident light to be diffracted by the Bragg grating. As such, when a single Bragg grating is used in a waveguide-based near-eye display, the field of view (FOV) and the working wavelength range of the waveguide-based near-eye display may be limited.

Figure 5:
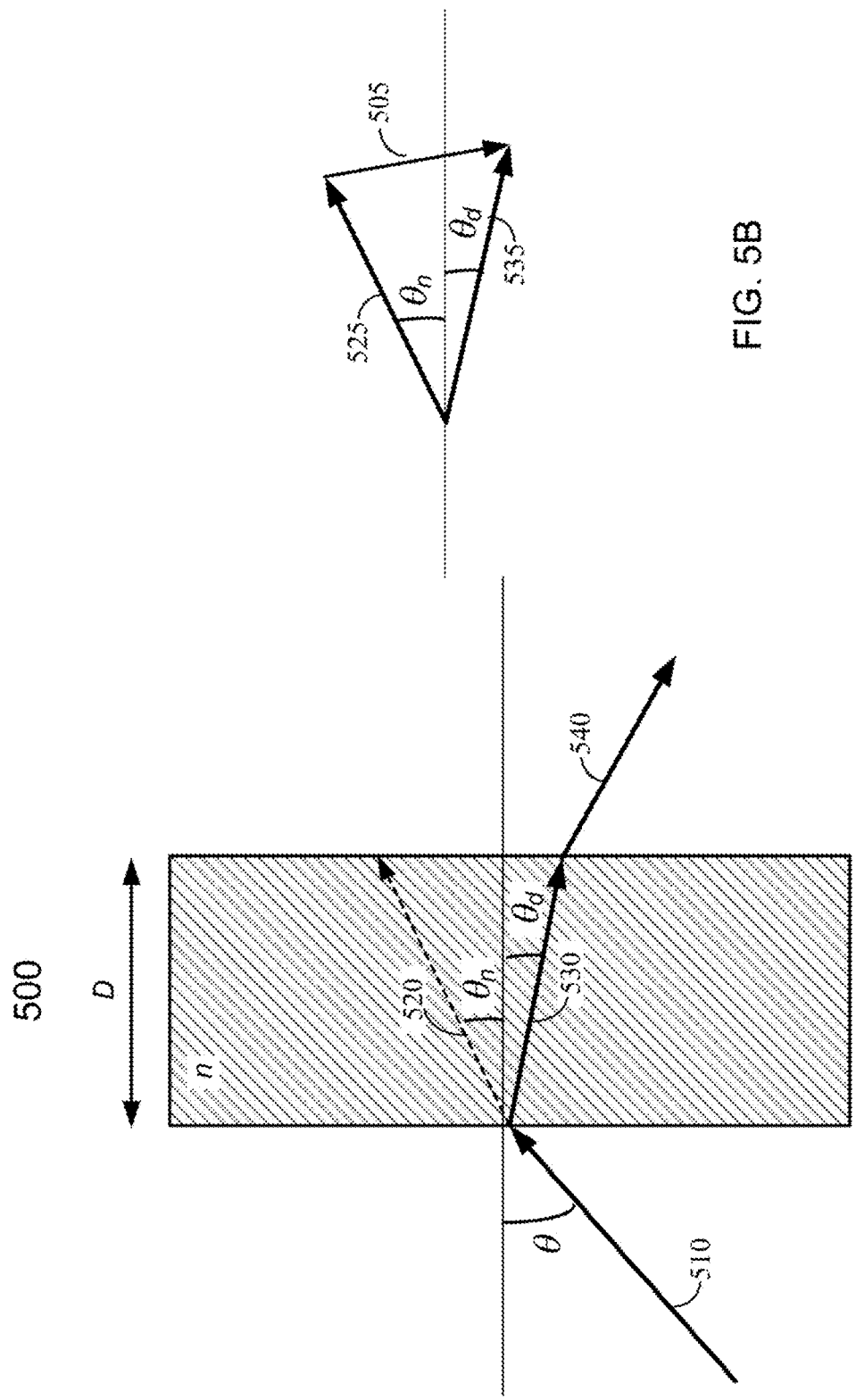
FIG. 5A illustrates an example of a volume Bragg grating.
FIG. 5B illustrates the Bragg condition for the volume Bragg grating shown in FIG. 5A.

FIG. 5A illustrates an example of a volume Bragg grating (VBG) 500. Volume Bragg grating 500 shown in FIG. 5A may include a transmission holographic grating that has a thickness D. The refractive index n of volume Bragg grating 500 may be modulated at an amplitude $n_1$, and the grating period of volume Bragg grating 500 may be $\Lambda$. Incident light 510 having a wavelength $\lambda$ may be incident on volume Bragg grating 500 at an incident angle $\theta$, and may be refracted into volume Bragg grating 500 as incident light 520 that propagates at an angle $\theta_n$ in volume Bragg grating 500. Incident light 520 may be diffracted by volume Bragg grating 500 into diffraction light 530, which may propagate at a diffraction angle $\theta_d$ in volume Bragg grating 500 and may be refracted out of volume Bragg grating 500 as diffraction light 540.

FIG. 5B illustrates the Bragg condition for volume Bragg grating 500 shown in FIG. 5A. Vector 505 represents the grating vector $\vec{G}$, where $|\vec{G}|=2\pi/\Lambda$. Vector 525 represents the incident wave vector $\vec{k}_i$, and vector 535 represents the diffract wave vector $\vec{k}_d$, where $|\vec{k}_i|=|\vec{k}_d|=2\pi n/\lambda$. Under the Bragg phase-matching condition, $\vec{k}_i-\vec{k}_d=\vec{G}$. Thus, for a given wavelength $\lambda$, there may only be one pair of incident angle $\theta$ (or $\theta_n$) and diffraction angle $\theta_d$ that meet the Bragg condition perfectly. Similarly, for a given incident angle $\theta$, there may only be one wavelength $\lambda$ that meets the Bragg condition perfectly. As such, the diffraction may only occur in a small wavelength range and a small incident angle range. The diffraction efficiency, the wavelength selectivity, and the angular selectivity of volume Bragg grating 500 may be functions of thickness D of volume Bragg grating 500. For example, the full-width-half-magnitude (FWHM) wavelength range and the FWHM angle range of volume Bragg grating 500 at the Bragg condition may be inversely proportional to thickness D of volume Bragg grating 500, while the maximum diffraction efficiency at the Bragg condition may be a function of $\sin^2(a \times n_1 \times D)$, where a is a coefficient. For a reflection volume Bragg grating, the maximum diffraction efficiency at the Bragg condition may be a function of $\tanh^2(a \times n_1 \times D)$.

In some designs, in order to achieve a large FOV (e.g., larger than ±30°) and diffract light of different colors, multiple waveguides each including a Bragg grating for a different color (e.g., R, G, or B) and/or a different FOV may be arranged in a stack for coupling the display light to the user's eyes. In some designs, a multiplexed Bragg grating may be used, where each part of the multiplexed Bragg grating may be used to diffract light in a different FOV range and/or within a different wavelength range. Thus, in some designs, in order to achieve a desired diffraction efficiency and a large FOV for the full visible spectrum (e.g., from about 400 nm to about 700 nm, or from about 440 nm to about 650 nm), one or more thick volume Bragg gratings each including a large number of gratings (or holograms) recorded by a large number of exposures (e.g., holographic recordings), such as a few hundred or more than 1000 exposures (or recordings), may be used.

In each exposure (or recording), two coherent beams may interfere with each other at certain angles to generate a unique interference pattern in a photosensitive material layer, which may in turn generate a unique refractive index modulation pattern in the photosensitive material layer, where the refractive index modulation pattern may correspond to the light intensity pattern of the interference pattern. In one example, the photosensitive material layer may include polymeric binders, monomers (e.g., acrylic monomers), and initiating agents, such as initiators, chain transfer agents, or photosensitizing dyes. The polymeric binders may act as the support matrix. The monomers may serve as refractive index modulators. The photosensitizing dyes may absorb light and interact with the initiators to polymerize the monomers. Thus, the interference pattern may cause the polymerization and diffusion of the monomers to bright fringes, thus generating concentration and density gradients that may result in refractive index modulation. For example, areas with a higher concentration of polymerization may have a higher refractive index. As the exposure and polymerization proceed, fewer monomers may be available for polymerization, and the diffusion may be suppressed. After all or substantially all monomers have been polymerized, no more new gratings may be recorded in the photosensitive material layer. In a thick VBG that includes a large number of gratings recorded in a large number of exposures, display haze may be significant.

In some waveguide-based near-eye display systems, in order to expand the eyebox of the waveguide-based near-eye display, two output gratings (or grating layers or portions of a multiplexed grating) may generally be used to expand the display light in two dimensions or along two axes (which may be referred to as dual-axis pupil expansion). By spatially separating the two output gratings and reducing the total number of exposures for each output grating, the display haze may be reduced because the see-through region (e.g., the middle) of the waveguide-based near-eye display may only include one output grating. For example, in some embodiments, the first output grating may be recorded with more exposures (e.g., >500 or >1000 times) and may be positioned outside of the see-through region of the waveguide-based near-eye display. The second output grating may be recorded with fewer exposures (e.g., <100 or <50 times) and may be positioned in the see-through region of the waveguide-based near-eye display. Thus, the display haze in the see-through region may be significantly reduced. However, because of the spatial separation of the two output gratings, the overall size of the waveguide-based near-eye display may be very large.

Figure 6:
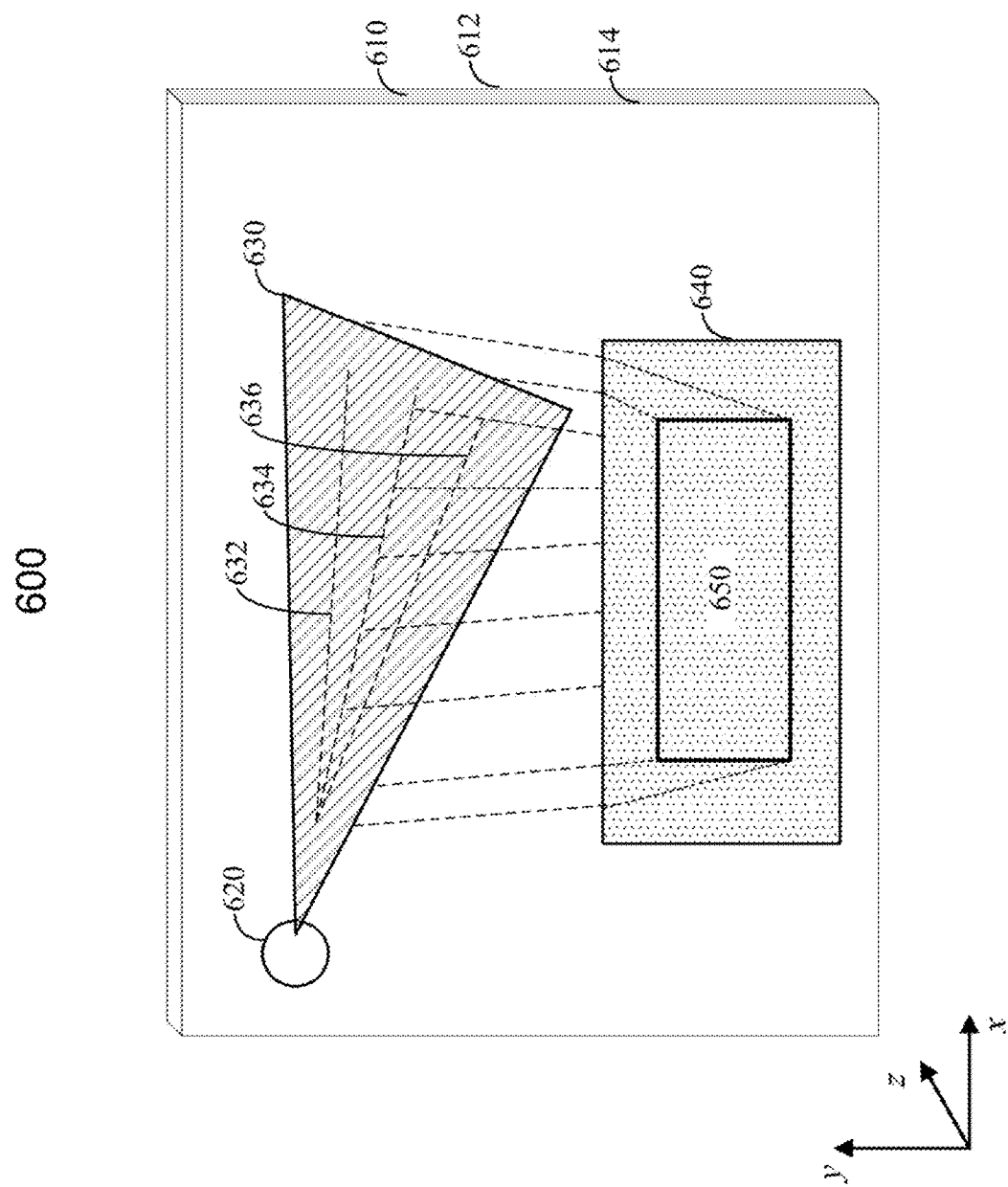
FIG. 6 illustrates an example of a volume Bragg grating-based waveguide display according to certain embodiments.

FIG. 6 illustrates an example of a volume Bragg grating-based waveguide display 600 according to certain embodiments. Waveguide display 600 may include a substrate 610 (i.e., a waveguide), which may be similar to substrate 420. Substrate 610 may be transparent to visible light and may include, for example, a glass, quartz, plastic, polymer, PMMA, ceramic, or crystal substrate. Substrate 610 may be a flat substrate or a curved substrate. Substrate 610 may include a first surface 612 and a second surface 614. Display light may be coupled into substrate 610 by an input coupler 620, and may be reflected by first surface 612 and second surface 614 through total internal reflection, such that the display light may propagate within substrate 610. As described above, input coupler 620 may include a diffractive coupler (e.g., a volume holographic grating or a surface-relief grating), a refractive coupler (e.g., a wedge or a prism), or a reflective coupler (e.g., a reflective surface having a slant angle with respect to substrate 610). For example, in one embodiment, input coupler 620 may include a prism that may couple display light of different colors into substrate 610 at a same refraction angle. In another example, input coupler 620 may include a grating coupler that may diffract light of different colors into substrate 610 at different directions. Input coupler 620 may have a coupling efficiency of greater than 30%, 50%, 75%, 90%, or higher for visible light.

Waveguide display 600 may also include a first output grating 630 and a second output grating 640 positioned on one or two surfaces (e.g., first surface 612 and second surface 614) of substrate 610 for expanding incident display light beam in two dimensions in order to fill an eyebox 650 (or output pupil) with the display light. In some embodiments, first output grating 630 may include one or more surface-relief gratings or volume Bragg gratings each configured to expand at least a portion of the display light beam along one direction, as shown by lines 632, 634, and 636. For example, while the display light propagates within substrate 610 along a direction shown by line 632, 634, or 636, a portion of the display light may be diffracted by first output grating 630 to second output grating 640 each time the display light propagating within substrate 610 reaches first output grating 630. Second output grating 640 may then expand the display light from first output grating 630 in a different direction by diffracting a portion of the display light to eyebox 650 each time the display light propagating within substrate 610 reaches second output grating 640.

As described above, first output grating 630 and second output grating 640 may each include a multiplexed VBG that includes multiple VBGs each designed for a specific FOV range and/or wavelength range. For example, first output grating 630 may include a few hundred or more VBGs (e.g., about 300 to about 1000 VBGs) recorded by a few hundred or more exposures, where each VBG may be recorded under a different condition. Second output grating 640 may also include tens or hundreds of VBGs (e.g., 50 or more VBGs) recorded by tens or hundreds of exposures.

Figure 7:
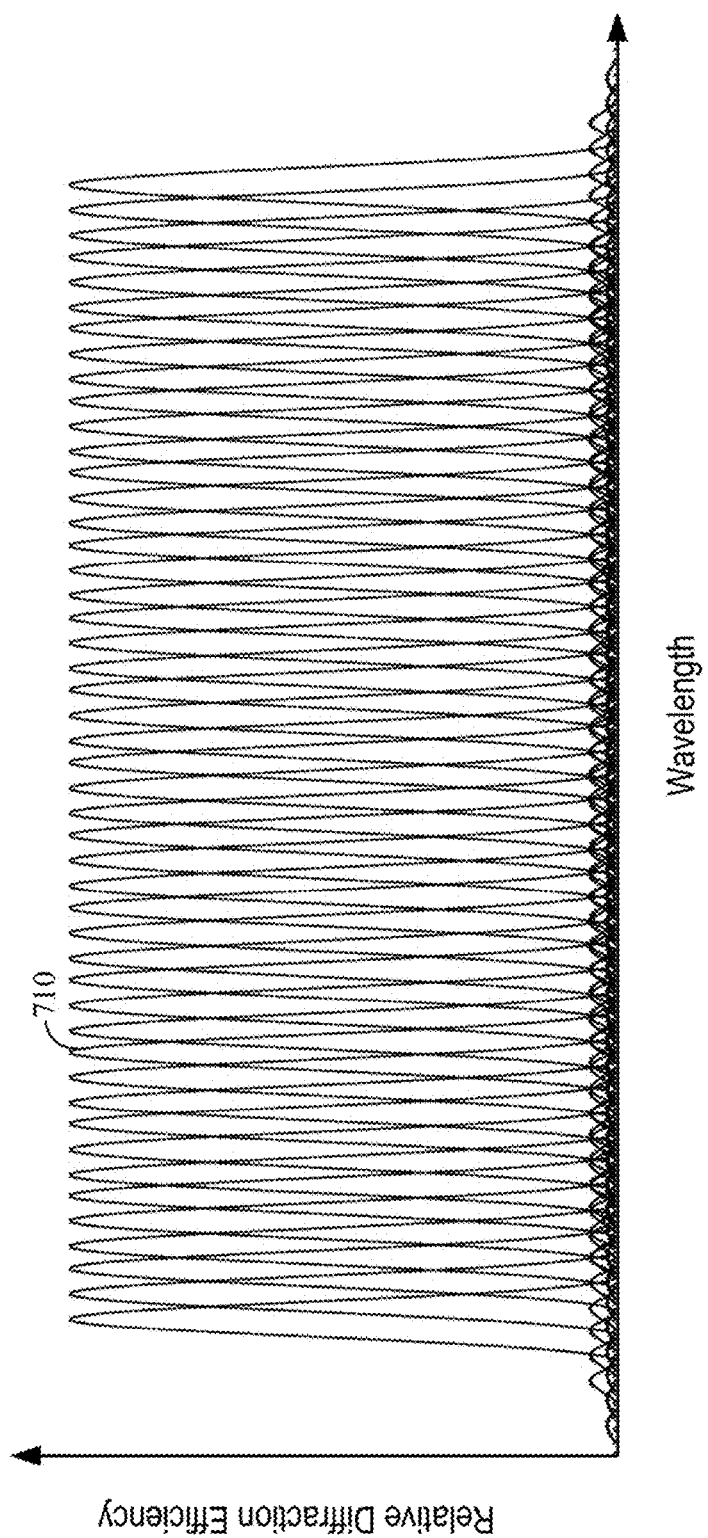
FIG. 7 illustrates the diffraction efficiency of an example of a multiplexed volume Bragg grating as a function of the wavelength of incident light according to certain embodiments.

FIG. 7 illustrates the diffraction efficiency of an example of a multiplexed volume Bragg grating (e.g., first output grating 630 or second output grating 640) as a function of the wavelength of incident light according to certain embodiments. Each curve 710 may represent the diffraction efficiency of a respective VBG and may be a sinc function of the wavelength of the display light. As described above, the FWHM wavelength range and the FWHM angle range of a volume Bragg grating near the Bragg condition may be inversely proportional to the thickness of the volume Bragg grating. For a VBG, the FWHM wavelength range and the FWHM angle range may be small. Thus, as shown in FIG. 7, a large number of VBGs (e.g., between about 300 and about 1000 VBGs) may be needed in order to cover a large FOV (e.g., greater than ±30°) and the full visible spectrum (e.g., from about 400 nm to about 700 nm or from about 440 nm to about 650 nm). Furthermore, in order to achieve a high diffraction efficiency for each of the large number of VBGs, at least one of the overall refractive index modulation of the grating materials (e.g., photopolymers) or the thickness of the grating material layer needs to high. For example, in some embodiments, a material layer having a large overall refractive index modulation (e.g., about 0.01 or larger) and a thickness of greater than, for example, 500 µm, may be needed. In general, the achievable overall refractive index modulation of a grating material is limited. Thus, to improve the diffraction efficiency of a multiplexed VBG that includes many VBGs, the thickness of the grating material layer may need to be high, which may in turn cause the FWHM wavelength range or the FWHM angle range to be small.

As described above, in a near-eye display for augmented reality (AR) applications, it may be desirable to reduce the number of VBGs and the thickness of the grating layer in the see-through region, through which the user may view the ambient environment, because many VBGs and/or a thick grating layer in the field of view of the eye may make the views of the ambient environment hazy or color-fringed, and may also reduce the contrast of the displayed virtual image. For at least these reasons, it may be desirable to limit the total number of VBGs (or exposures) in the see-through region to, for example, fewer than about 200 VBGs or fewer than about 100 VBGs, and/or to reduce the thickness of the VBGs to, for example, less than about 200 µm or less than about 100 µm. As such, as illustrated in FIG. 6, first output grating 630 and second output grating 640 may need to be spatially separated, where second output grating 640 that includes fewer VBGs may be positioned in the see-through region of waveguide display 600 and may overlap with eyebox 650, while first output grating 630 may be positioned outside the see-through region of waveguide display 600 in order to reduce the display haze. As a result, the overall size of the waveguide display may be much larger than the see-through region. For example, some waveguide displays may have a two-dimensional area larger than 70×70 mm$^2$, which may be much larger than the lenses in a regular pair of eye glasses.

According to certain embodiments, to reduce display haze, increase FOV, expand eyebox, and also reduce the physical size of the waveguide display, the two output gratings (e.g., first output grating 630 and second output grating 640) for dual-axis pupil expansion in a grating-based waveguide display may overlap in at least a portion of the optical see-through region of the waveguide display. The first output grating may include two or more sub-gratings or sub-regions, where a first sub-grating (or sub-region) may guide the display light in a first direction to a second sub-grating (or sub-region) for pupil replication in the first direction, and the second sub-grating (or sub-region) may direct the display light to the second output grating. The second output grating may expand the pupil in a second direction and direct the display light to the eyebox of the waveguide display. Each of the two or more sub-gratings (or sub-regions) of the first output grating and the second output grating may be recorded in a small number of exposures (e.g., less than about 40 or 50) on a thin (e.g., less than about 20 µm) grating material (e.g., photopolymer) layer. The second sub-grating (or sub-region) of the first output grating may overlap with the second output grating in at least a portion of the see-through region of the waveguide display to reduce the physical size of the waveguide display. Because the second sub-grating (or sub-region) of the first output grating and the second output grating may each have a relatively small number of VBGs on a thin grating layer, the total number of VBGs in the see-through region may be small (e.g., less than about 200 or less than about 100), and the overall thickness of the grating layers in the see-through region may be, for example, less than about 200 µm or about 100 µm, such as about 20 µm or about 40 µm.

Because the grating is much thinner (compared with, e.g., about 500 µm), there may be some dispersion, but the dispersion may be much less compared with the case where the grating has a thickness of, for example, 1 µm. In addition, the two sub-gratings or sub-regions of the first output grating may be recorded in a same number of exposures and under same recording conditions (but may use different exposure durations to achieve different diffraction efficiencies), such that they can match each other to reduce the overall dispersion (due to opposite Bragg conditions, e.g., +1 order and −1 order diffractions).

Figure 8:
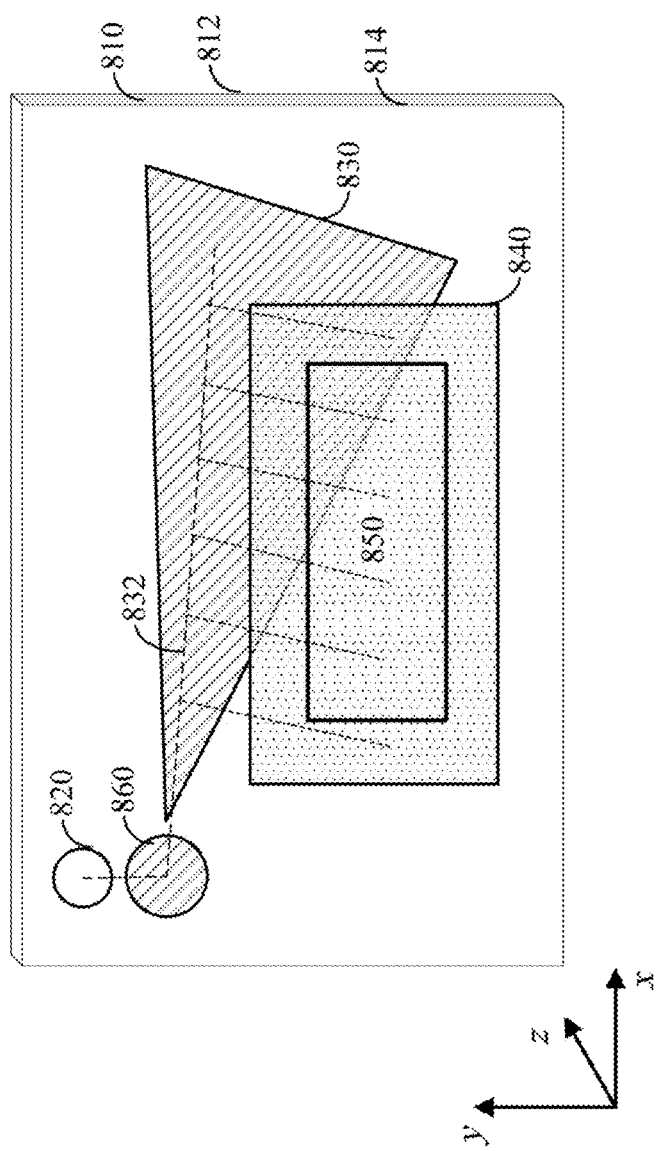
FIG. 8 illustrates an example of a volume Bragg grating-based waveguide display with a reduced form-factor according to certain embodiments.

FIG. 8 illustrates an example of a volume Bragg grating-based waveguide display 800 with a reduced form-factor according to certain embodiments. As waveguide display 600, waveguide display 800 may include a substrate 810, which may be similar to substrate 610 but may be much smaller than substrate 610. Substrate 810 may include a first surface 812 and a second surface 814. Display light from a light source (e.g., LEDs) may be coupled into substrate 810 by an input coupler 820, and may be reflected by first surface 812 and second surface 814 through total internal reflection, such that the display light may propagate within substrate 810. As described above, input coupler 820 may include a diffractive coupler (e.g., a volume holographic grating or a surface-relief grating), a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle.

As waveguide display 600, waveguide display 800 may also include a first output grating 830 and a second output grating 840 formed on first surface 812 and/or second surface 814. For example, first output grating 830 and second output grating 840 may be formed on a same surface or two different surface of substrate 810. Second output grating 840 may be formed in the see-through region of the waveguide display and may overlap with an eyebox 850 (or output pupil) when viewed in the z direction. First output grating 830 and second output grating 840 may be used for dual-axis pupil expansion to expand the incident display light beam in two dimensions to fill eyebox 850 with the display light. First output grating 830 and second output grating 840 may each be a transmission grating or a reflection grating.

In addition, waveguide display 800 may also include a third grating 860 formed on first surface 812 or second surface 814. In some embodiments, third grating 860 and first output grating 830 may be on a same surface of substrate 810. In some embodiments, third grating 860 and first output grating 830 may be in different regions of a same grating or a same grating material layer. In some embodiments, third grating 860 may be spatially separate from first output grating 830. In some embodiments, third grating 860 and first output grating 830 may be recorded in a same number of exposures and under same recording conditions (but may be recorded for different exposure durations to achieve different diffraction efficiencies), such that each VBG in third grating 860 may match a respective VBG in first output grating 830. For example, a VBG in third grating 860 and a corresponding VBG in first output grating 830 may have the same grating period and the same grating slant angle (and thus the same grating vector), and the same thickness. In one embodiment, third grating 860 and first output grating 830 may have a thickness about 20 µm and may each include about 40 VBGs recorded through about 40 exposures. In some embodiments, second output grating 840 may have a thickness about 20 µm or higher, and may include about 50 VBGs recorded through about 50 exposures.

Input coupler 820 may couple the display light from the light source into substrate 810. The display light may reach third grating 860 directly or may be reflected by first surface 812 and/or second surface 814 to third grating 860, where the size of the display light beam may be larger than that at input coupler 820. Each VBG in third grating 860 may diffract a portion of the display light within a FOV range and a wavelength range that approximately satisfies the Bragg condition of the VBG to first output grating 830. While the display light diffracted by a VBG in third grating 860 propagates within substrate 810 (e.g., along a direction shown by a line 832) through total internal reflection, a portion of the display light may be diffracted by the corresponding VBG in first output grating 830 to second output grating 840 each time the display light propagating within substrate 810 reaches first output grating 830. Second output grating 840 may then expand the display light from first output grating 830 in a different direction by diffracting a portion of the display light to eyebox 850 each time the display light propagating within substrate 810 reaches second output grating 840.

Because third grating 860 and first output grating 830 may be thin (e.g., about 20 µm), they may cause some dispersion, but the dispersion may not be as high as the dispersion of a grating having a thickness of, for example, 1 µm or thinner.

Therefore, the field of view may not be affected much by the dispersion. In addition, as described above, each VBG in third grating 860 matches a respective VBG in first output grating 830 (i.e., having the same grating vector), and the two matching VBGs work under opposite Bragg conditions (e.g., +1 order diffraction versus −1 order diffraction) due to the opposite propagation directions of the display light at the two matching VBGs. For example, as shown in FIG. 8, the VBG in third grating 860 may change the propagation direction of the incident light from a downward direction to a rightward direction, while the VBG in first output grating 830 may change the propagation direction of the incident light from a rightward direction to a downward direction. Thus, the dispersion caused by first output grating 830 may at least partially counteract the dispersion caused by third grating 860 to reduce the overall dispersion.

Because first output grating 830 and second output grating 840 may only have a small number (e.g., no greater than 50) of VBGs and exposures, first output grating 830 may also be placed in the see-through region to overlap with second output grating 840, thus reducing the size of the waveguide display. The total number of VBGs and exposures in a given see-through region may be less than, for example, 100 or fewer (e.g., no more than about 40 in first output grating 830 and no more than 50 in second output grating 840). Thus, the display haze may be reduced significantly compared with the case where 500 or more VBGs are in the see-through region.

In some embodiments, because of the fewer exposures (i.e., smaller number of gratings in a multiplexed grating), the multiplexed grating may not be able to cover the full visible light spectrum and/or the full FOV, and thus some light information (in some spectral or FOV ranges) may be lost.

Figure 9:
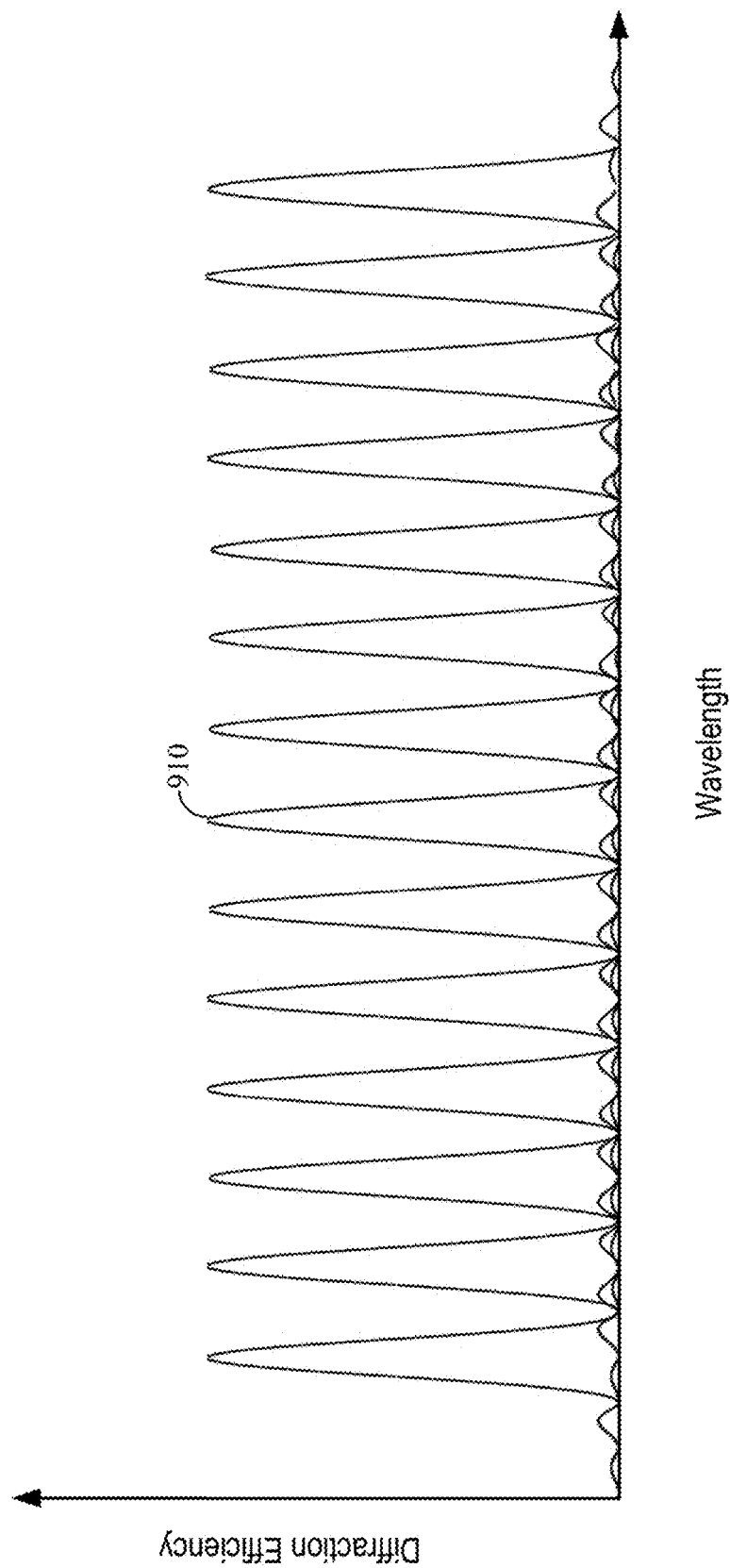
FIG. 9 illustrates the diffraction efficiency of an example of a multiplexed volume Bragg grating as a function of the wavelength of incident light according to certain embodiments.

FIG. 9 illustrates the diffraction efficiency of an example of a multiplexed volume Bragg grating (e.g., first output grating 830 or third grating 860) as a function of the wavelength of incident light according to certain embodiments. Each curve 910 may represent the diffraction efficiency of a respective VBG and may be a sinc function of the wavelength of the display light. As described above, the FWHM wavelength range and the FWHM angle range of a volume Bragg grating near the Bragg condition may be inversely proportional to the thickness of the volume Bragg grating. Thus, because first output grating 830 or third grating 860 may have a thickness much lower than the thickness of first output grating 630, the FWHM wavelength range of each VBG shown by each curve 910 may be larger than the FWHM wavelength range of each VBG shown by each curve 710. However, the fewer VBGs in third grating 860 or first output grating 830 may not cover the entire visible spectrum. For example, in some embodiments, about half of the display light may not be diffracted.

In some embodiments, in order to improve the power efficiency and to cover a broader spectrum, additional gratings may be added at different spatial locations, such as different x, y, or z locations, to spatially multiplex the gratings. In this way, light in a broader bandwidth may be diffracted at a higher diffraction efficiency by the gratings to the eyebox. This may also help to increase the pupil replication density and make the light more uniform in the eyebox.

Figure 10:
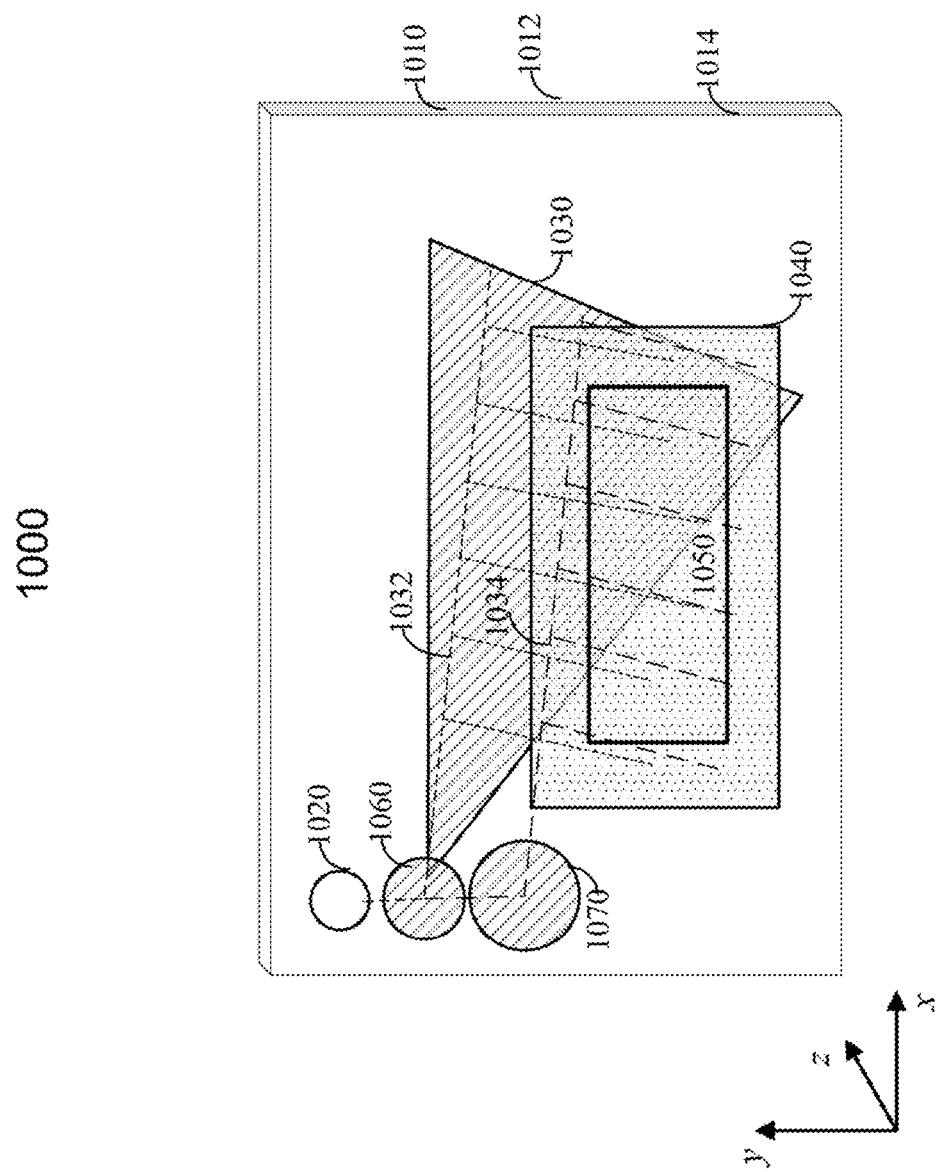
FIG. 10 illustrates an example of a volume Bragg grating-based waveguide display with a reduced form-factor and an improved power efficiency according to certain embodiments.

FIG. 10 illustrates an example of a volume Bragg grating-based waveguide display 1000 with a reduced form-factor and an improved power efficiency according to certain embodiments. As waveguide display 800, waveguide display 1000 may include a substrate 1010, which may be similar to substrate 810. Substrate 1010 may include a first surface 1012 and a second surface 1014. Display light from a light source (e.g., LEDs) may be coupled into substrate 1010 by an input coupler 1020, and may be reflected by first surface 1012 and second surface 1014 through total internal reflection, such that the display light may propagate within substrate 1010. As described above, input coupler 1020 may include a diffractive coupler, a refractive coupler, or a reflective coupler. For example, in one embodiment, input coupler 1020 may include a prism, which may couple display light of different colors into substrate 1010 at a same refraction angle.

As waveguide display 800, waveguide display 1000 may also include a first output grating 1030 and a second output grating 1040 formed on first surface 1012 and/or second surface 1014. Waveguide display 1000 may also include a third grating 1060 and a fourth grating 1070 formed on first surface 1012 and/or second surface 1014. Third grating 1060 and fourth grating 1070 may each be a multiplexed VBG that includes multiple VBGs. In some embodiments, third grating 1060, fourth grating 1070, and first output grating 1030 may be on a same surface of substrate 1010. In some embodiments, third grating 1060, fourth grating 1070, and first output grating 1030 may be in different regions of a same grating or a same grating material layer.

In some embodiments, third grating 1060 and fourth grating 1070 may each include M VBGs, and first output grating 1030 may include 2×M VBGs. Third grating 1060 and first output grating 1030 may be recorded in M exposures and under same recording conditions (but may be recorded for different exposure durations to achieve different diffraction efficiencies), such that each VBG in third grating 1060 may match a respective VBG in first output grating 1030. For example, a VBG in third grating 1060 and a corresponding VBG in first output grating 1030 may have the same grating period and the same grating slant angle (and thus the same grating vector), and the same thickness. Fourth grating 1070 and first output grating 1030 may also be recorded in M exposures and under same recording conditions (but for different exposure durations), such that each VBG in fourth grating 1070 may match a respective VBG in first output grating 1030 (i.e., having the same grating vector). The recording conditions for recording third grating 1060 may be different from the recording conditions for recording fourth grating 1070, such that third grating 1060 and fourth grating 1070 may have different Bragg conditions. In some embodiments, M VBGs in first output grating 1030 that match the M VBGs in third grating 1060 may be recorded in one area (e.g., an upper region) of first output grating 1030, while the other M VBGs in first output grating 1030 that match the M VBGs in fourth grating 1070 may be recorded in a different area (e.g., a lower region) of first output grating 1030. In one example, third grating 1060 and fourth grating 1070 may each have a thickness about 20 μm and may each include about 20 VBGs recorded through about 20 exposures. First output grating 1030 may have a thickness about 20 μm and may include about 40 VBGs recorded at different regions through about 40 exposures. Second output grating 1040 may have a thickness about 20 μm or higher, and may include about 50 VBGs recorded through about 50 exposures.

Input coupler 1020 may couple the display light from the light source into substrate 1010. The display light may reach third grating 1060 directly or may be reflected by first surface 1012 and/or second surface 1014 to third grating 1060, where the size of the display light beam may be larger than that at input coupler 1020. Each VBG in third grating 1060 may diffract a portion of the display light within a FOV range and a wavelength range that approximately satisfies the Bragg condition of the VBG to an upper region of first output grating 1030. As described above, the upper region of first output grating 1030 may at least include VBGs that match the VBGs in third grating 1060. Therefore, while the display light diffracted by a VBG in third grating 1060 propagates within substrate 1010 (e.g., along a direction shown by a line 1032) through total internal reflection, a portion of the display light may be diffracted by the corresponding VBG in first output grating 1030 to second output grating 1040 each time the display light propagating within substrate 1010 reaches first output grating 1030.

Display light that is not diffracted by third grating 1060 may continue to propagate within substrate 1010, and may reach fourth grating 1070. Each VBG in fourth grating 1070 may diffract a portion of the display light within a FOV range and a wavelength range that approximately satisfies the Bragg condition of the VBG to a lower region of first output grating 1030. As described above, the lower region of first output grating 1030 may at least include VBGs that match the VBGS in fourth grating 1070. Therefore, while the display light diffracted by a VBG in fourth grating 1070 propagates within substrate 1010 (e.g., along a direction shown by a line 1034) through total internal reflection, a portion of the display light may be diffracted by the corresponding VBG in first output grating 1030 to second output grating 1040 each time the display light propagating within substrate 1010 reaches first output grating 1030.

Second output grating 1040 may expand the display light from first output grating 1030 in a different direction by diffracting a portion of the display light to eyebox 1050 each time the display light propagating within substrate 1010 reaches second output grating 1040. In this way, the display light may be expanded in two dimensions to fill eyebox 1050. The pupil replication density may be increased, and the light may be more uniform in the eyebox, due to the diffraction of display light by two spatially multiplexed sets of VBGs. In addition, display light in a broader bandwidth may be diffracted at a higher diffraction efficiency by the gratings to the eyebox because of the lower number of exposures (and thus a higher refractive index modulation $n_1$ for each VBG). Thus, the power efficiency of the waveguide display may be improved.

Figure 11:
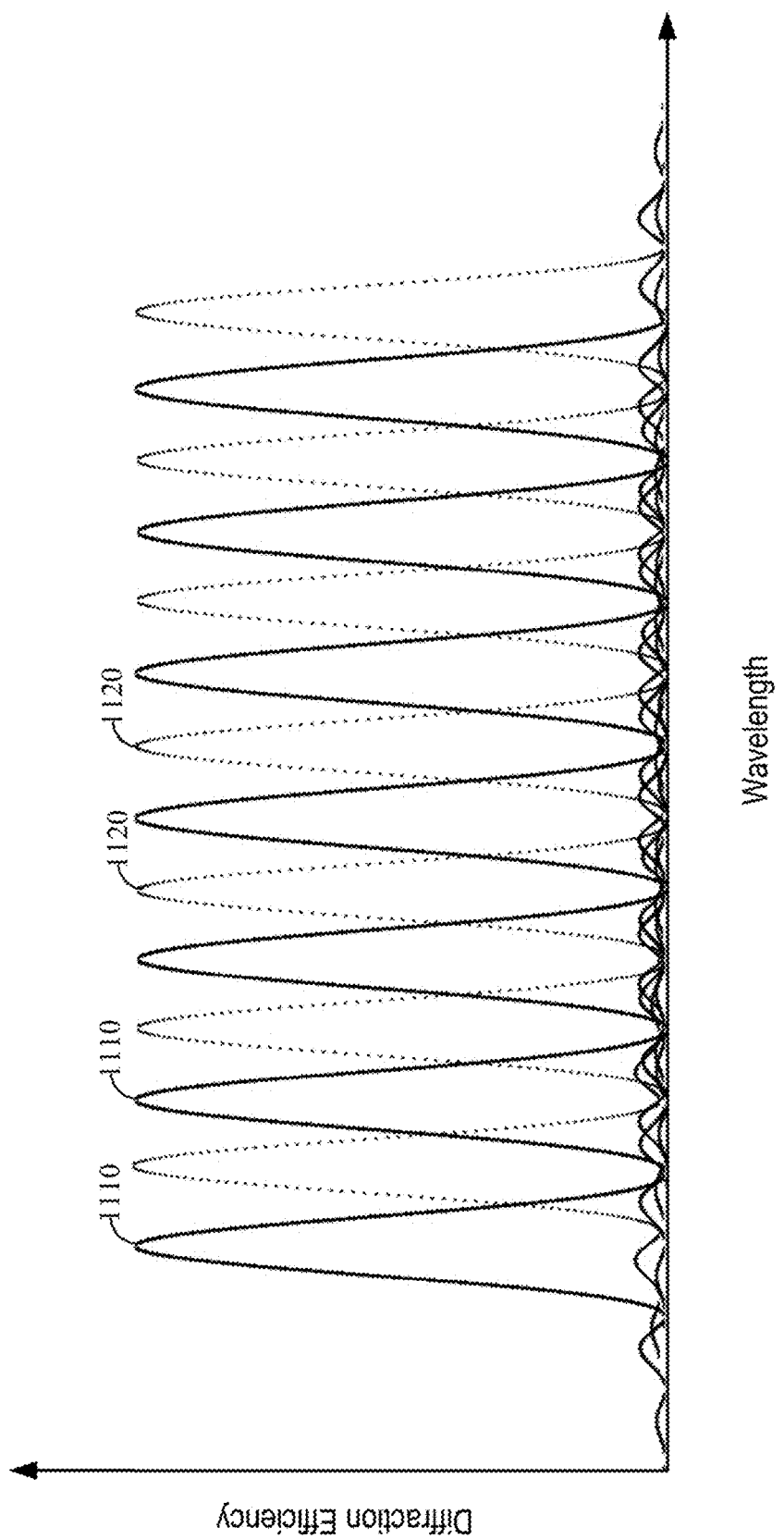
FIG. 11 illustrates the diffraction efficiency of an example of a multiplexed volume Bragg grating as a function of the wavelength of incident light according to certain embodiments.

FIG. 11 illustrates the diffraction efficiency of an example of a multiplexed volume Bragg grating (e.g., spatially multiplexed third grating 1060 and fourth grating 1070, or first output grating 1030) as a function of the wavelength of incident light according to certain embodiments. Each curve 1110 (in a solid line) may represent the diffraction efficiency of one VBG in, for example, third grating 1060, or a corresponding VBG in first output grating 1030. Each curve 1120 (in a dotted line) may represent the diffraction efficiency of one VBG in, for example, fourth grating 1070, or a corresponding VBG in first output grating 1030. FIG. 11 shows that display light in a broader bandwidth may be diffracted at higher diffraction efficiencies.

Figure 12:
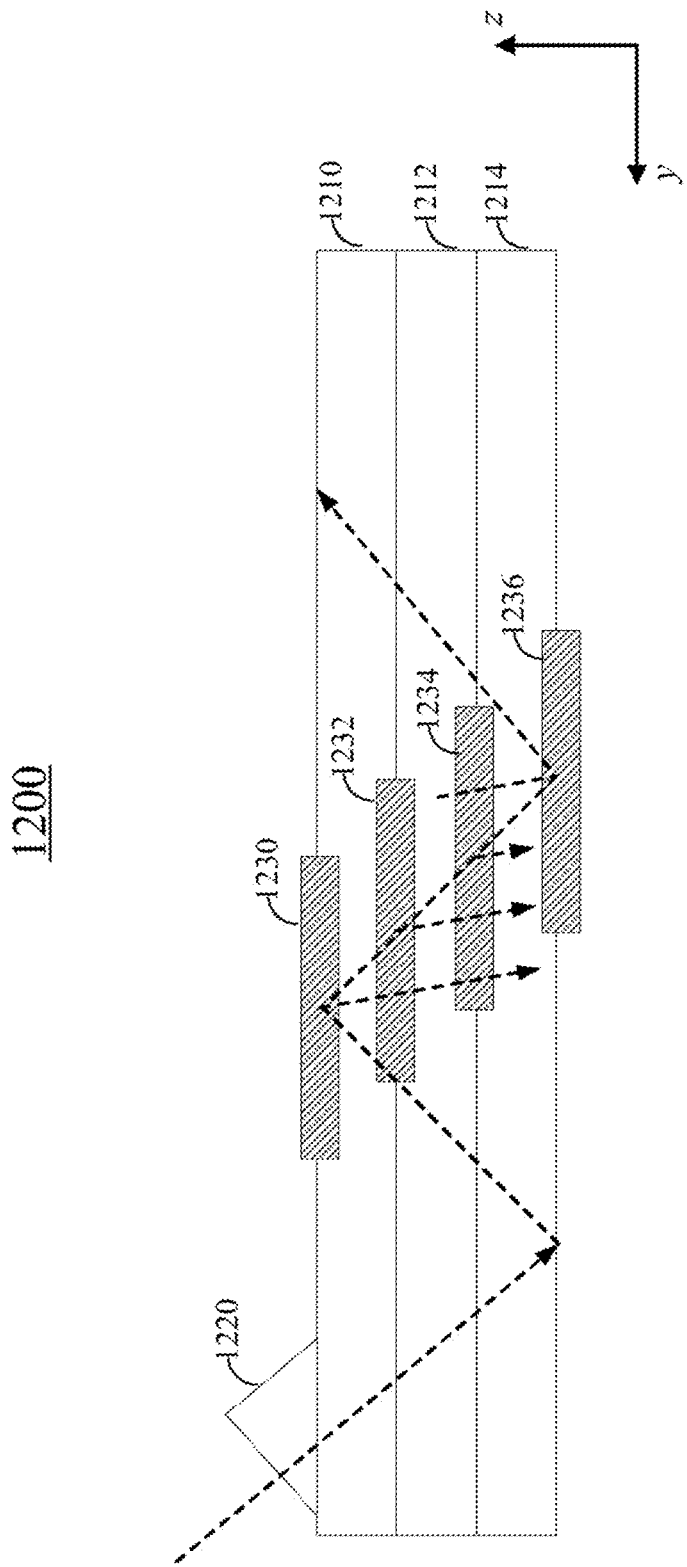
FIG. 12 illustrates an example of a volume Bragg grating-based waveguide display with a reduced form-factor and an improved power efficiency according to certain embodiments.

FIG. 12 illustrates an example of a volume Bragg grating-based waveguide display 1200 with a reduced form-factor and an improved power efficiency according to certain embodiments. In waveguide display 1200, gratings may be spatially multiplexed along the z direction, rather than on the x-y plane as shown in FIG. 10. For example, waveguide display 1200 may include multiple substrates, such as substrates 1210, 1212, 1214, and the like. The substrates may include a same material or materials having similar refractive indexes. One or more multiplexed VBGs (e.g., multiplexed VBGs 1230, 1232, 1234, 1236, and the like) may be fabricated on each substrate. Some of the multiplexed VBGs may include reflection gratings, while some of the multiplexed VBGs may include transmission gratings. The substrates with the multiplexed VBGs may be arranged in a substrate stack along the z direction for spatial multiplexing. Each multiplexed VBG may include multiple VBGs designed for different Bragg conditions to diffract display light in different wavelength ranges and/or different FOVs. In one example, each multiplexed VBG may include 10 VBGs, and thus VBGs 1230, 1232, 1234, and 1236 may include a total of 40 VBGs.

Display light may be coupled into the substrate stack by an input coupler 1220 (e.g., a prism) and may propagate within the substrate stack through total internal reflection. The display light may reach each multiplexed VBG 1230, 1232, 1234, or 1236, and may be diffracted by the VBGs in multiplexed VBG 1230, 1232, 1234, or 1236 to a first output grating (not shown in FIG. 12). The first output grating may also include multiple multiplexed VBGs on substrates 1210, 1212, and 1214 and may be spatially multiplexed in the z direction. Each VBG in the first output grating may match a VBG in multiplexed VBG 1230, 1232, 1234, or 1236, and may expand the display light beam in one direction and diffract the display light to a second output grating (not shown in FIG. 12) as described above.

In some embodiments, the gratings, such as first output grating 830, second output grating 840, and third grating 860 in FIG. 8, or first output grating 1030, second output grating 1040, third grating 1060, and fourth grating 1070 in FIG. 10, may be arranged in different manners (e.g., at different locations or in different orientations).

Figure 13:
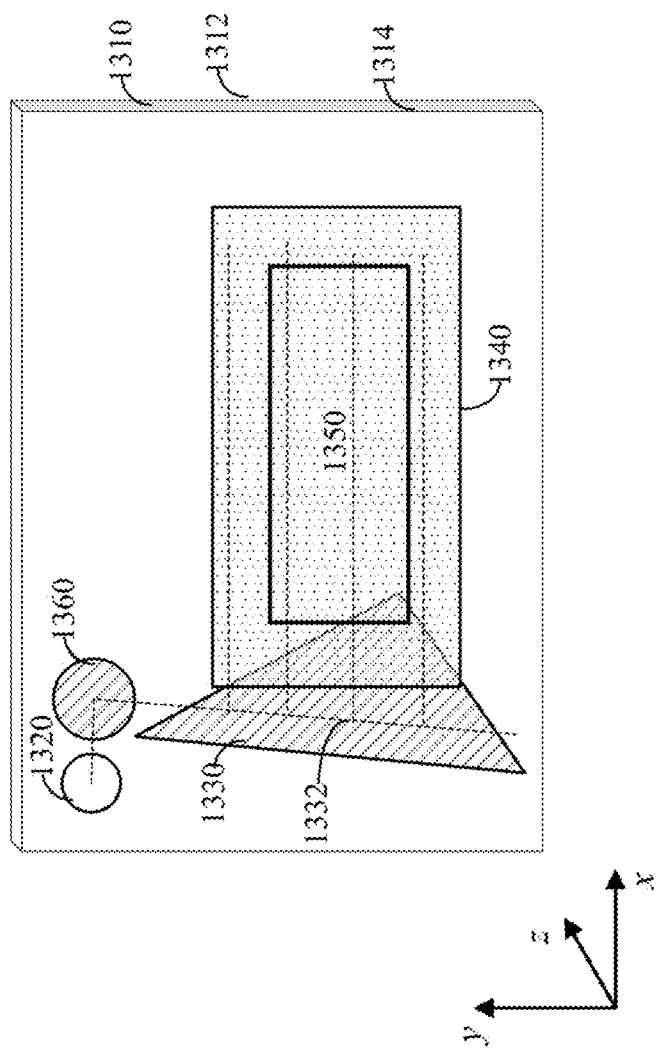
FIG. 13 illustrates an example of a volume Bragg grating-based waveguide display with a reduced form-factor and an improved power efficiency according to certain embodiments.

FIG. 13 illustrates an example of a volume Bragg grating-based waveguide display 1300 with a reduced form-factor and an improved power efficiency according to certain embodiments. As waveguide display 800, waveguide display 1300 may include a substrate 1310, which may be similar to substrate 810. Substrate 1310 may include a first surface 1312 and a second surface 1314. Display light from a light source (e.g., LEDs) may be coupled into substrate 1310 by an input coupler 1320, and may be reflected by first surface 1312 and second surface 1314 through total internal reflection, such that the display light may propagate within substrate 1310. As described above, input coupler 1320 may include a diffractive coupler, a refractive coupler, or a reflective coupler. Waveguide display 1300 may also include a first output grating 1330 and a second output grating 1340 formed on first surface 1312 and/or second surface 1314. In the example shown in FIG. 13, first output grating 1330 and second output grating 1340 may be at different locations in the x direction, and may overlap in at least a portion of the see-through region of waveguide display 1300. First output grating 1330 and second output grating 1340 may be used for dual-axis pupil expansion to expand the incident display light beam in two dimensions to fill eyebox 1350 with the display light. For example, first output grating 1330 may expand the display light beam in approximately the y direction, while second output grating 1340 may expand the display light beam in approximately the x direction.

In addition, waveguide display 1300 may include a third grating 1360 formed on first surface 1312 and/or second surface 1314. In some embodiments, third grating 1360 and first output grating 1330 may be arranged at different locations in the y direction on a same surface of substrate 1310. In some embodiments, third grating 1360 and first output grating 1330 may be in different regions of a same grating or a same grating material layer. In some embodiments, third grating 1360 may be spatially separate from first output grating 1330. In some embodiments, third grating 1360 and first output grating 1330 may be recorded in a same number of exposures and under same recording conditions (but may be recorded for different exposure durations to achieve different diffraction efficiencies), such that each VBG in third grating 1360 may match a respective VBG in first output grating 1330.

Input coupler 1320 may couple the display light from the light source into substrate 1310. The display light may propagate approximately along the x direction within substrate 1310, and may reach third grating 1360 directly or may be reflected by first surface 1312 and/or second surface 1314 to third grating 1360. Each VBG in third grating 1360 may diffract a portion of the display light within a FOV range and a wavelength range that approximately satisfies the Bragg condition of the VBG downward to first output grating 1330. While the display light diffracted by a VBG in third grating 1360 propagates within substrate 1310 along a direction (e.g., approximately in the y direction shown by a line 1332) through total internal reflection, a portion of the display light may be diffracted by the corresponding VBG in first output grating 1330 to second output grating 1340 each time the display light propagating within substrate 1310 reaches first output grating 1330. Second output grating 1340 may then expand the display light from first output grating 1330 in a different direction (e.g., approximately in the x direction) by diffracting a portion of the display light to eyebox 1350 each time the display light propagating within substrate 1310 reaches second output grating 1340.

Each of first output grating 1330 and second output grating 1340 may have a thickness less than, for example, 100 μm (e.g., 20 μm), and may include, for example, fewer than 50 VBGs. Thus, any area in the optical see-through region of waveguide display 1300 may include fewer than 100 VBGs. As such, the display haze may not be significant. In addition, the physical dimensions of waveguide display 1300 may be similar to the physical dimensions of a lens in a regular pair of eye glasses.

The above-described embodiments are for illustration purposes only, and are not intended to limit the scope of the present disclosure to those specific examples. For example, the various gratings described above may be arranged in other manners in the x, y, z directions. In some embodiments, the gratings may be in any desired shape. For example, first output grating 830, 1030, or 1330 may be in the shape of an oval, a triangle, a rectangle, a trapezoid, or another polygon. Second output grating 840, 1040, or 1340 may be in the shape of an oval, a rectangle, a trapezoid, or another polygon. Third grating 860, 1060, or 1360, and fourth grating 1070 may be in a shape of an oval, a square, a trapezoid, or another polygon. One skilled in the art will readily recognize from the above description that alternative embodiments of the structures illustrated may be employed without departing from the principles, or benefits touted, of this disclosure.

Figure 14:
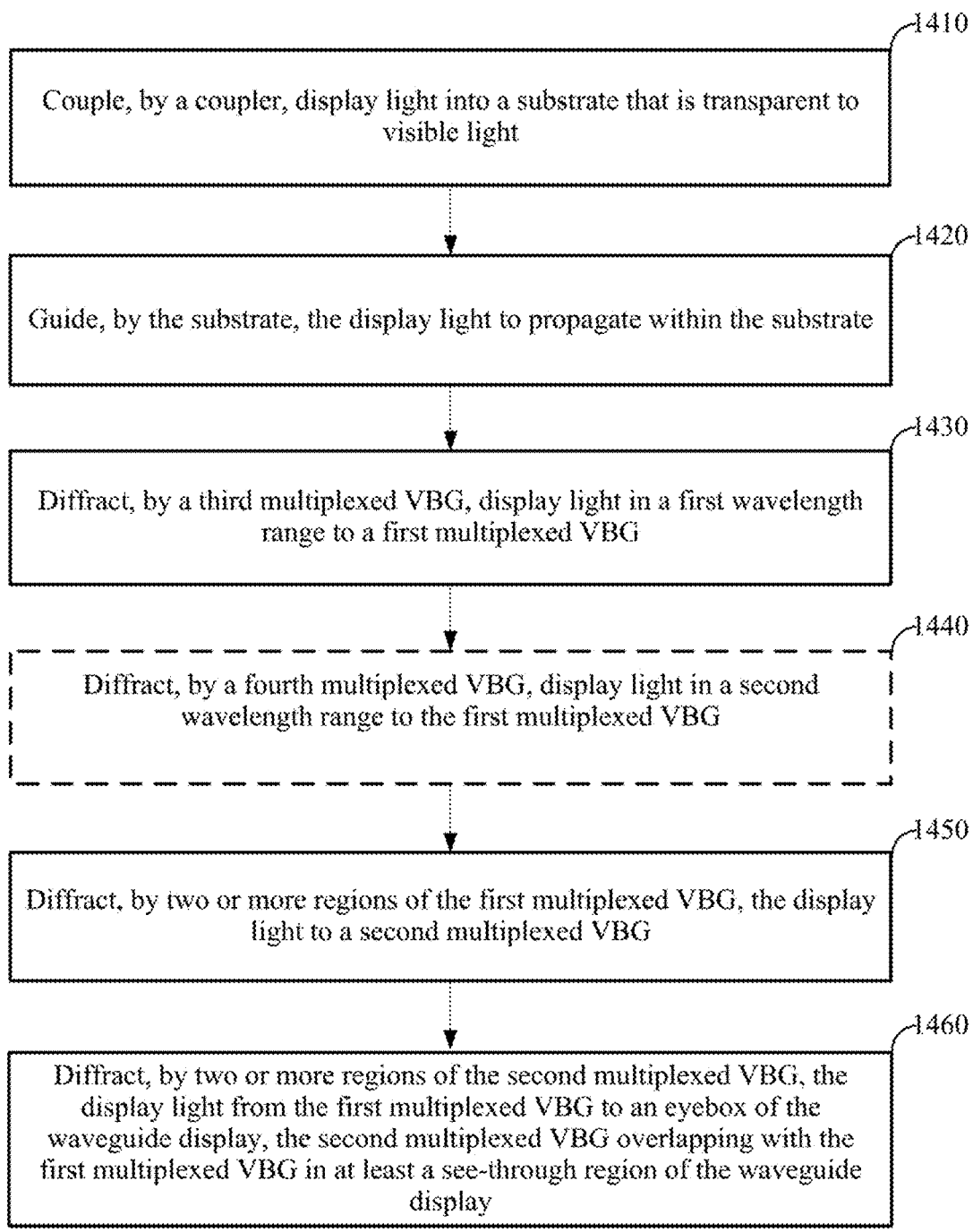
FIG. 14 illustrates an example method of displaying images using a waveguide display according to certain embodiments.

FIG. 14 illustrates an example of a method of displaying images using a waveguide display according to certain embodiments. The operations described in flow chart 1400 are for illustration purposes only and are not intended to be limiting. In various implementations, modifications may be made to flow chart 1400 to add additional operations or to omit some operations. The operations described in flow chart 1400 may be performed by, for example, waveguide display 800, 1000, 1200, or 1300 described above.

At block 1410, a coupler (e.g., input coupler 820, 1020, 1220, or 1320) may couple display light from a light source (e.g., LEDs) into a substrate (e.g., substrate 810, 1010, 1210, 1212, 1214, or 1310) that is transparent to visible light. As described above, the coupler may include a diffractive coupler (e.g., a volume holographic grating or a surface-relief grating), a refractive coupler (e.g., a wedge or a prism), or a reflective coupler (e.g., a reflective surface having a slant angle with respect to a substrate). For example, in one embodiment, the coupler may include a prism that may couple display light of different colors into substrate at a same refraction angle.

At block 1420, the substrate may guide the display light to propagate within the substrate. As described above, the substrate may include a first surface and second surface, and the display light may be coupled into the substrate at an angle that can cause total internal reflection of the display light at the surface of the substrate. Thus, the display light may propagate within the substrate in a zigzag manner.

At block 1430, a third multiplexed VBG (e.g., third grating 860, 1060, or 1360) may diffract display light, for example, in a first wavelength range, to a first multiplexed VBG. The third multiplexed VBG may include multiple VBGs each having a respective grating vector same as the grating vector of a respective VBG in the first multiplexed VBG. In some embodiments, the third multiplexed VBG may diffract the display light to a first region of the first multiplexed VBG. In some embodiments, the third multiplexed VBG may include fewer than 100 or fewer than 50 VBGs, such as 40, 20, or 10 VBGs. In some embodiments, the thickness of the third multiplexed VBG may be less than 100 μm, less than 50 μm, or less than 40 μm, such as 20 μm.

Optionally, at block 1440, a fourth multiplexed VBG may diffract display light in a second wavelength range to the first multiplexed VBG. The fourth multiplexed VBG may include multiple VBGs each having a respective grating vector same as the grating vector of a respective VBG in the first multiplexed VBG. In some embodiments, the fourth multiplexed VBG may diffract the display light to a second region of the first multiplexed VBG. In some embodiments, the fourth multiplexed VBG may include fewer than 100 or fewer than 50 VBGs, such as 40, 20, or 10 VBGs. In some embodiments, the thickness of the fourth multiplexed VBG may be less than 100 μm, less than 50 μm, or less than 40 μm, such as 20 μm. In some embodiments, the third multiplexed VBG and the fourth multiplexed VBG may be on a same surface of the substrate and may be offset from each other. In some embodiments, the third multiplexed VBG and the fourth multiplexed VBG may be on different layers or different surfaces of the substrate.

At block 1450, two or more regions of the first multiplexed VBG may diffract the display light to different regions of a second multiplexed VBG. For example, while the display light diffracted by a VBG in the third multiplexed VBG propagates within the substrate along a first direction through total internal reflection, a portion of the display light may be diffracted by the corresponding VBG in the first multiplexed VBG to the second multiplexed VBG each time the display light propagating within the substrate reaches the first multiplexed VBG. In some embodiments, the first multiplexed VBG may include fewer than 100 or fewer than 50 VBGs, such as 40 VBGs. In some embodiments, the thickness of the first multiplexed VBG may be less than 100 μm, less than 50 μm, or less than 40 μm, such as 20 μm.

At block 1460, two or more regions of the second multiplexed VBG may diffract the display light from the first multiplexed VBG to an eyebox of the waveguide display, where the second multiplexed VBG may overlap with the first multiplexed VBG in at least a see-through region of the waveguide display. For example, the second multiplexed VBG may expand the display light from the first multiplexed VBG in a different direction by diffracting a portion of the display light to the eyebox each time the display light propagating within the substrate reaches the second multiplexed VBG. In some embodiments, the thickness of the second multiplexed VBG may be less than 100 μm, less than 50 μm, or less than 40 μm, such as 20 μm. In this way, two-dimensional pupil expansion may be achieved using a waveguide display that has a small form-factor and a low display haze, because of the overlapping of the first multiplexed VBG and the second multiplexed VBG, and the thin grating layer and the small number of VBGs in the see-through region of the waveguide display.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 15:
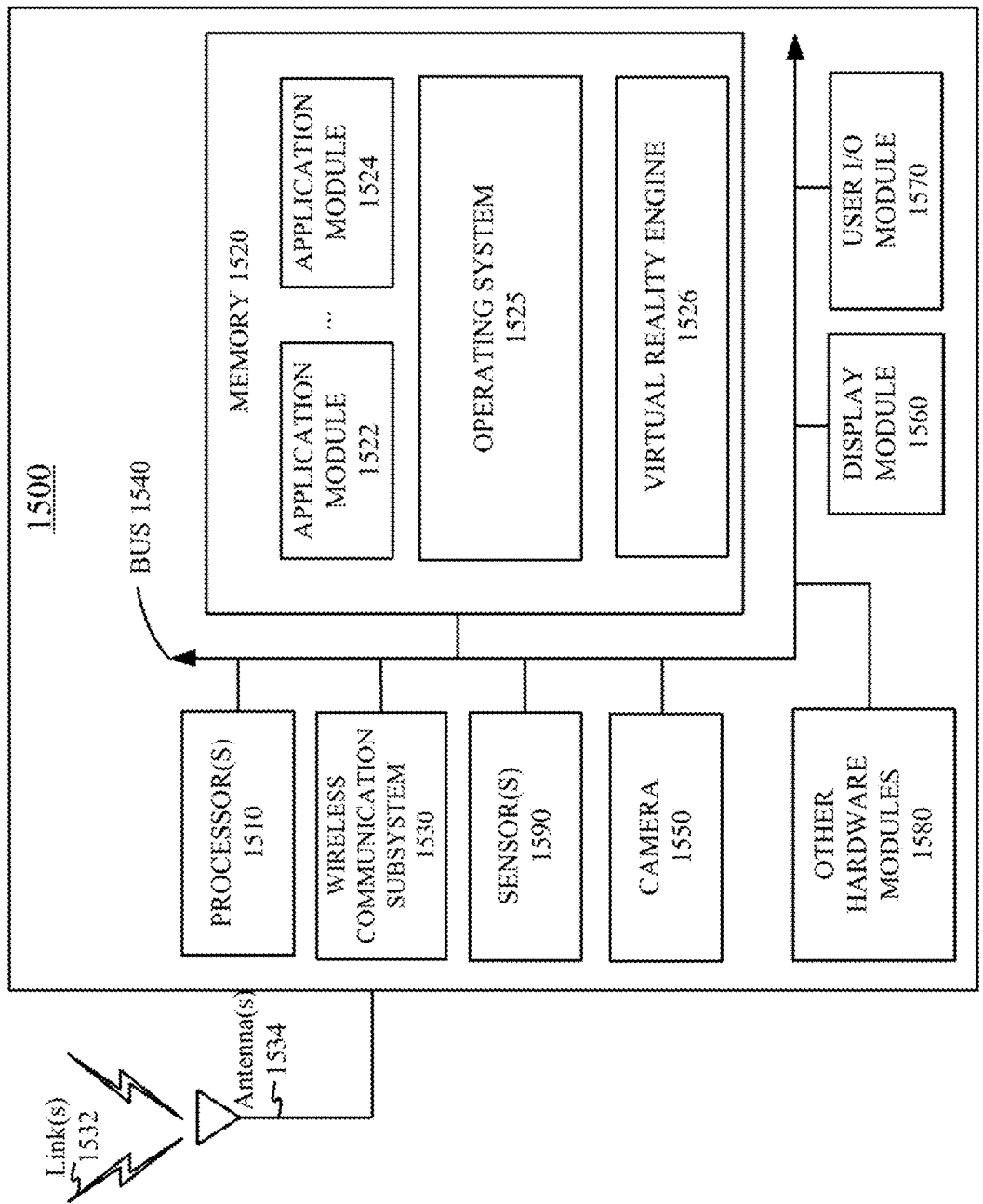
FIG. 15 is a simplified block diagram of an example electronic system of an example near-eye display according to certain embodiments.

FIG. 15 is a simplified block diagram of an example electronic system 1500 of an example near-eye display (e.g., HMD device) for implementing some of the examples disclosed herein. Electronic system 1500 may be used as the electronic system of an HMD device or other near-eye displays described above. In this example, electronic system 1500 may include one or more processor(s) 1510 and a memory 1520. Processor(s) 1510 may be configured to execute instructions for performing operations at a number of components, and can be, for example, a general-purpose processor or microprocessor suitable for implementation within a portable electronic device. Processor(s) 1510 may be communicatively coupled with a plurality of components within electronic system 1500. To realize this communicative coupling, processor(s) 1510 may communicate with the other illustrated components across a bus 1540. Bus 1540 may be any subsystem adapted to transfer data within electronic system 1500. Bus 1540 may include a plurality of computer buses and additional circuitry to transfer data. Memory 1520 may be coupled to processor(s) 1510. In some embodiments, memory 1520 may offer both short-term and long-term storage and may be divided into several units. Memory 1520 may be volatile, such as static random access memory (SRAM) and/or dynamic random access memory (DRAM) and/or non-volatile, such as read-only memory (ROM), flash memory, and the like. Furthermore, memory 1520 may include removable storage devices, such as secure digital (SD) cards. Memory 1520 may provide storage of computer-readable instructions, data structures, program modules, and other data for electronic system 1500. In some embodiments, memory 1520 may be distributed into different hardware modules. A set of instructions and/or code might be stored on memory 1520. The instructions might take the form of executable code that may be executable by electronic system 1500, and/or might take the form of source and/or installable code, which, upon compilation and/or installation on electronic system 1500 (e.g., using any of a variety of generally available compilers, installation programs, compression/decompression utilities, etc.), may take the form of executable code.

In some embodiments, memory 1520 may store a plurality of application modules 1522 through 1524, which may include any number of applications. Examples of applications may include gaming applications, conferencing applications, video playback applications, or other suitable applications. The applications may include a depth sensing function or eye tracking function. Application modules 1522-1524 may include particular instructions to be executed by processor(s) 1510. In some embodiments, certain applications or parts of application modules 1522-1524 may be executable by other hardware modules 1580. In certain embodiments, memory 1520 may additionally include secure memory, which may include additional security controls to prevent copying or other unauthorized access to secure information.

In some embodiments, memory 1520 may include an operating system 1525 loaded therein. Operating system 1525 may be operable to initiate the execution of the instructions provided by application modules 1522-1524 and/or manage other hardware modules 1580 as well as interfaces with a wireless communication subsystem 1530 which may include one or more wireless transceivers. Operating system 1525 may be adapted to perform other operations across the components of electronic system 1500 including threading, resource management, data storage control and other similar functionality.

Wireless communication subsystem 1530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1500 may include one or more antennas 1534 for wireless communication as part of wireless communication subsystem 1530 or as a separate component coupled to any portion of the system. Depending on desired functionality, wireless communication subsystem 1530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1530 may permit data to be exchanged with a network, other computer systems, and/or any other devices described herein. Wireless communication subsystem 1530 may include a means for transmitting or receiving data, such as identifiers of HMD devices, position data, a geographic map, a heat map, photos, or videos, using antenna(s) 1534 and wireless link(s) 1532. Wireless communication subsystem 1530, processor(s) 1510, and memory 1520 may together comprise at least a part of one or more of a means for performing some functions disclosed herein.

Embodiments of electronic system 1500 may also include one or more sensors 1590. Sensor(s) 1590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1500 may include a display module 1560. Display module 1560 may be a near-eye display, and may graphically present information, such as images, videos, and various instructions, from electronic system 1500 to a user. Such information may be derived from one or more application modules 1522-1524, virtual reality engine 1526, one or more other hardware modules 1580, a combination thereof, or any other suitable means for resolving graphical content for the user (e.g., by operating system 1525). Display module 1560 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1500 may include a user input/output module 1570. User input/output module 1570 may allow a user to send action requests to electronic system 1500. An action request may be a request to perform a particular action. For example, an action request may be to start or end an application or to perform a particular action within the application. User input/output module 1570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1500. In some embodiments, user input/output module 1570 may provide haptic feedback to the user in accordance with instructions received from electronic system 1500. For example, the haptic feedback may be provided when an action request is received or has been performed.

Electronic system 1500 may include a camera 1550 that may be used to take photos or videos of a user, for example, for tracking the user's eye position. Camera 1550 may also be used to take photos or videos of the environment, for example, for VR, AR, or MR applications. Camera 1550 may include, for example, a complementary metal-oxidesemiconductor (CMOS) image sensor with a few millions or tens of millions of pixels. In some implementations, camera 1550 may include two or more cameras that may be used to capture 3-D images.

In some embodiments, electronic system 1500 may include a plurality of other hardware modules 1580. Each of other hardware modules 1580 may be a physical module within electronic system 1500. While each of other hardware modules 1580 may be permanently configured as a structure, some of other hardware modules 1580 may be temporarily configured to perform specific functions or temporarily activated. Examples of other hardware modules 1580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1580 may be implemented in software.

In some embodiments, memory 1520 of electronic system 1500 may also store a virtual reality engine 1526. Virtual reality engine 1526 may execute applications within electronic system 1500 and receive position information, acceleration information, velocity information, predicted future positions, or some combination thereof of the HMD device from the various sensors. In some embodiments, the information received by virtual reality engine 1526 may be used for producing a signal (e.g., display instructions) to display module 1560. For example, if the received information indicates that the user has looked to the left, virtual reality engine 1526 may generate content for the HMD device that mirrors the user's movement in a virtual environment. Additionally, virtual reality engine 1526 may perform an action within an application in response to an action request received from user input/output module 1570 and provide feedback to the user. The provided feedback may be visual, audible, or haptic feedback. In some implementations, processor(s) 1510 may include one or more GPUs that may execute virtual reality engine 1526.

In various implementations, the above-described hardware and modules may be implemented on a single device or on multiple devices that can communicate with one another using wired or wireless connections. For example, in some implementations, some components or modules, such as GPUs, virtual reality engine 1526, and applications (e.g., tracking application), may be implemented on a console separate from the head-mounted display device. In some implementations, one console may be connected to or support more than one HMD.

In alternative configurations, different and/or additional components may be included in electronic system 1500. Similarly, functionality of one or more of the components can be distributed among the components in a manner different from the manner described above. For example, in some embodiments, electronic system 1500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display, comprising:
    a substrate transparent to visible light;
    a coupler configured to couple display light into the substrate such that the display light propagates within the substrate through total internal reflection;
    a first multiplexed volume Bragg grating (VBG) on a first region of the substrate; and
    a second multiplexed VBG only on a second region of the substrate, the second region different from the first region, and the second multiplexed VBG overlapping with the first multiplexed VBG in at least a see-through region of the waveguide display,
    wherein the first multiplexed VBG is configured to diffract the display light to two or more regions of the second multiplexed VBG along a first direction, and
    wherein the second multiplexed VBG is configured to diffract the display light to two or more regions of an eyebox of the waveguide display along a second direction.

2. The waveguide display of claim 1, wherein the first multiplexed VBG includes fewer than 100 VBGs recorded by fewer than 100 exposures.

3. The waveguide display of claim 2, wherein the first multiplexed VBG includes fewer than 50 VBGs recorded by fewer than 50 exposures.

4. The waveguide display of claim 1, wherein the first multiplexed VBG is characterized by a thickness less than 100 μm.

5. The waveguide display of claim 4, wherein the thickness of the first multiplexed VBG is less than 50 μm.

6. The waveguide display of claim 1, wherein the second multiplexed VBG includes fewer than 100 VBGs recorded by fewer than 100 exposures.

7. The waveguide display of claim 6, wherein the second multiplexed VBG includes fewer than 50 VBGs recorded by fewer than 50 exposures.

8. The waveguide display of claim 1, further comprising a third multiplexed VBG on the substrate, the third multiplexed VBG configured to diffract the display light coupled into the substrate by the coupler to the first multiplexed VBG.

9. The waveguide display of claim 8, wherein the third multiplexed VBG includes a plurality of VBGs, each VBG of the plurality of VBGs having a respective grating vector same as a grating vector of a respective VBG in the first multiplexed VBG.

10. The waveguide display of claim 9, wherein the first multiplexed VBG and the third multiplexed VBG are recorded by a same number of exposures.

11. The waveguide display of claim 1, further comprising:
    a third multiplexed VBG on the substrate; and
    a fourth multiplexed VBG on the substrate,
    wherein the third multiplexed VBG is configured to diffract a first portion of the display light coupled into the substrate by the coupler to the first multiplexed VBG; and
    wherein the fourth multiplexed VBG is configured to diffract a second portion of the display light coupled into the substrate by the coupler to the first multiplexed VBG.

12. The waveguide display of claim 11, wherein the first portion of the display light and the second portion of the display light correspond to different wavelength ranges or different fields of view.

13. The waveguide display of claim 11, wherein:
    the first multiplexed VBG includes a first set of VBGs and a second set of VBGs;

the third multiplexed VBG includes a third set of VBGs, each VBG in the third set of VBGs having a respective grating vector same as a grating vector of a respective VBG in the first set of VBGs; and the fourth multiplexed VBG includes a fourth set of VBGs, each VBG in the fourth set of VBGs having a respective grating vector same as a grating vector of a respective VBG in the second set of VBGs.

14. The waveguide display of claim 13, wherein the first set of VBGs and the second set of VBGs are in different regions of the first multiplexed VBG.

15. The waveguide display of claim 11, wherein the third multiplexed VBG and the fourth multiplexed VBG are in different regions on a surface of the substrate or are on different layers or surfaces of the substrate.

16. The waveguide display of claim 1, wherein:
the first multiplexed VBG includes a first region and a second region;
the first region is configured to diffract the display light coupled into the substrate by the coupler to the second region of the first multiplexed VBG; and
the second region of the first multiplexed VBG at least partially overlaps with the second multiplexed VBG and is configured to diffract the display light to the second multiplexed VBG.

17. The waveguide display of claim 1, wherein the coupler includes a diffractive coupler, a refractive coupler, or a reflective coupler.

18. The waveguide display of claim 1, wherein:
the first multiplexed VBG is configured to expand the display light in the first direction; and
the second multiplexed VBG is configured to expand the display light in the second direction.

19. A method of displaying images using a waveguide display, the method comprising:
coupling, by a coupler, display light into a substrate that is transparent to visible light;
guiding, by the substrate, the display light to propagate within the substrate;
diffracting, by two or more regions of a first multiplexed volume Bragg grating (VBG) on a first region of the substrate, the display light to two or more regions of a second multiplexed VBG along a first direction, the second multiplexed VBG only on a second region of the substrate, and the second region different from the first region; and
diffracting, by each of the two or more regions of the second multiplexed VBG, the display light from the first multiplexed VBG to two or more regions of an eyebox of the waveguide display along a second direction,
wherein the second multiplexed VBG overlaps with the first multiplexed VBG in at least a see-through region of the waveguide display.

20. The method of claim 19, further comprising:
diffracting, by a third multiplexed VBG, the display light coupled into the substrate by the coupler to the first multiplexed VBG.

21. The method of claim 20, wherein each VBG in the third multiplexed VBG has a respective grating vector same as a grating vector of a respective VBG in the first multiplexed VBG.

22. The method of claim 19, further comprising:
diffracting, by a third multiplexed VBG, display light in a first wavelength range to the first multiplexed VBG; and
diffracting, by a fourth multiplexed VBG, display light in a second wavelength range to the first multiplexed VBG,
wherein the fourth multiplexed VBG is closer to the second multiplexed VBG than the third multiplexed VBG.

23. The method of claim 22, wherein:
diffracting the display light in the first wavelength range to the first multiplexed VBG includes diffracting the display light in the first wavelength range to a first region of the first multiplexed VBG; and
diffracting the display light in the second wavelength range to the first multiplexed VBG includes diffracting the display light in the second wavelength range to a second region of the first multiplexed VBG that is offset from the first region.

* * * * *